(12) United States Patent
Ozawa et al.

(10) Patent No.: US 9,077,835 B2
(45) Date of Patent: Jul. 7, 2015

(54) IMAGE SCANNING UNIT

(75) Inventors: Junya Ozawa, Yamanashi (JP);
Shinnosuke Enomoto, Yamanashi (JP);
Fumimasa Amemiya, Yamanashi (JP);
Toru Ochiai, Yamanashi (JP); Fumihide Sakamoto, Yamanashi (JP); Yuichi Kagami, Yamanashi (JP)

(73) Assignee: NISCA CORPORATION, Minamikoma-Gun, Yamanashi (JP)

( * ) Notice: Subject to any disclaimer, the term of this patent is extended or adjusted under 35 U.S.C. 154(b) by 0 days.

(21) Appl. No.: 14/126,691

(22) PCT Filed: Jan. 31, 2012

(86) PCT No.: PCT/JP2012/052112
§ 371 (c)(1),
(2), (4) Date: Dec. 16, 2013

(87) PCT Pub. No.: WO2012/176487
PCT Pub. Date: Dec. 27, 2012

(65) Prior Publication Data
US 2014/0111835 A1 Apr. 24, 2014

(30) Foreign Application Priority Data

Jun. 20, 2011 (JP) .................................. 2011-136808
Jun. 20, 2011 (JP) .................................. 2011-136809
Jun. 20, 2011 (JP) .................................. 2011-136810

(51) Int. Cl.
*H04N 1/04* (2006.01)
*H04N 1/00* (2006.01)
(Continued)

(52) U.S. Cl.
CPC ............ *H04N 1/00525* (2013.01); *H04N 1/028* (2013.01); *H04N 1/04* (2013.01); *G03B 27/16* (2013.01); *H04N 1/00559* (2013.01); *H04N 1/02815* (2013.01)

(58) Field of Classification Search
CPC .............. H04N 1/02815; H04N 1/193; H04N 1/40056; H04N 2201/02868; H04N 1/1013; H04N 3/1581; H04N 1/031; H04N 2201/03138; H04N 1/484; H04N 1/12; H01L 27/14665

USPC ......... 358/484, 475, 482, 483, 474, 509, 505; 250/208.1, 239, 234–236, 216, 227.11; 399/211, 220, 221; 355/67, 70
See application file for complete search history.

(56) References Cited

U.S. PATENT DOCUMENTS 5,019,703 A 5/1991 Boyd et al.
7,123,389 B2 10/2006 Yui
(Continued)

FOREIGN PATENT DOCUMENTS

JP 2001-255601 A 9/2001
JP 2004-254249 A 9/2004
(Continued)

*Primary Examiner* — Cheukfan Lee
(74) *Attorney, Agent, or Firm* — Manabu Kanesaka

(57) ABSTRACT

Provided is an image scanning unit which makes it possible to improve scanning accuracy while also making the overall body thinner by appropriately positioning a plurality of reflection members within an effective space in a carriage frame without wasting space. An image scanning unit, wherein a frame is divided into at least two spaces facing an irradiation surface, a first accommodation unit for accommodating a light source unit is formed in one of the spaces, a second accommodation unit for accommodating at least one reflection member is formed in the other adjacent space, a first reflection member for initially receiving light reflected from the irradiation surface is positioned at the side opposite the irradiation surface with the first accommodation unit positioned therebetween, and a light-shielding member is provided between the first reflection member and the reflection member positioned in the other space and prevents light that has strayed from a scanning light path from the first reflection member from being incident on the reflection member in the other space.

12 Claims, 23 Drawing Sheets

(51) Int. Cl.
*H04N 1/028* (2006.01)
*G03B 27/16* (2006.01)

(56) References Cited

U.S. PATENT DOCUMENTS

| | | | |
|---|---|---|---|
| 7,505,184 B2* | 3/2009 | Hayashide | 358/497 |
| 7,817,311 B2* | 10/2010 | Kim et al. | 358/475 |
| 2001/0050784 A1 | 12/2001 | Lam et al. | |
| 2008/0062475 A1 | 3/2008 | Sugiyama et al. | |
| 2009/0034024 A1* | 2/2009 | Kim et al. | 358/475 |
| 2009/0034030 A1* | 2/2009 | Nagatani et al. | 358/509 |
| 2011/0102862 A1 | 5/2011 | Inoue et al. | |
| 2013/0314756 A1* | 11/2013 | Amemiya et al. | 358/497 |

FOREIGN PATENT DOCUMENTS

| | | |
|---|---|---|
| JP | 2008-067275 A | 3/2008 |
| JP | 2010-068411 A | 3/2010 |

* cited by examiner

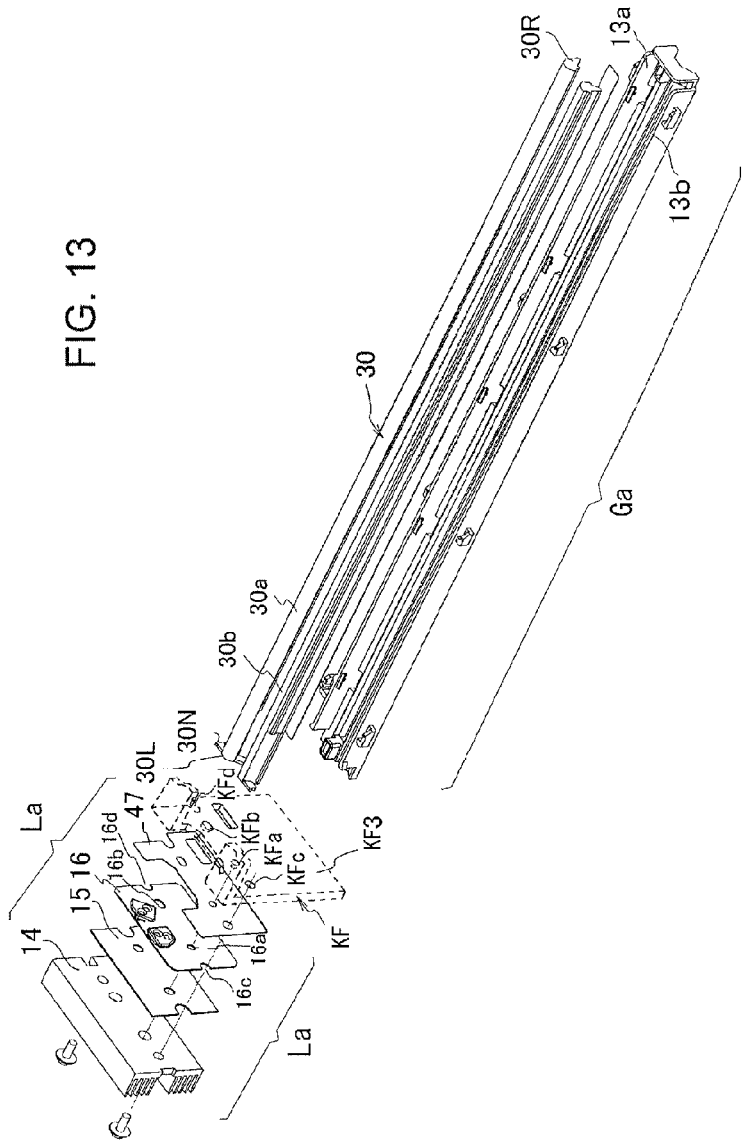

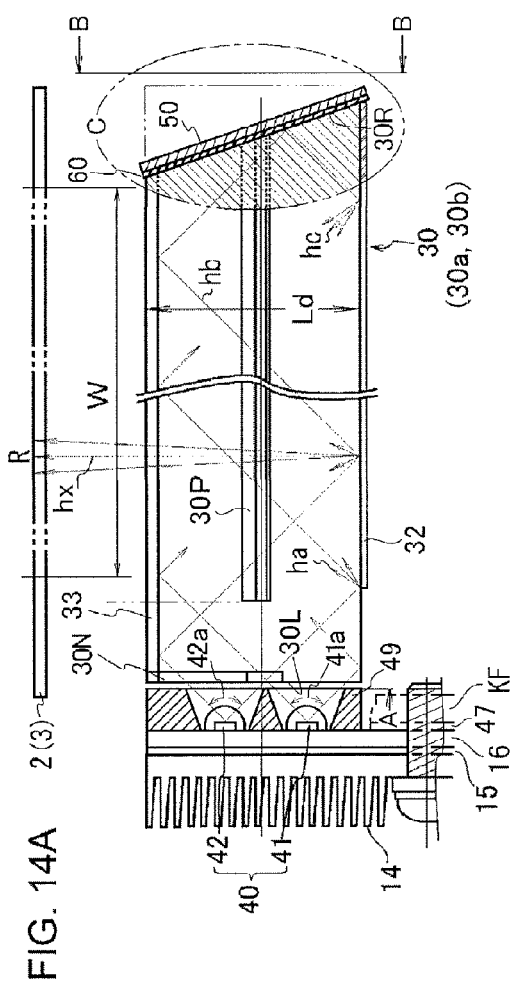
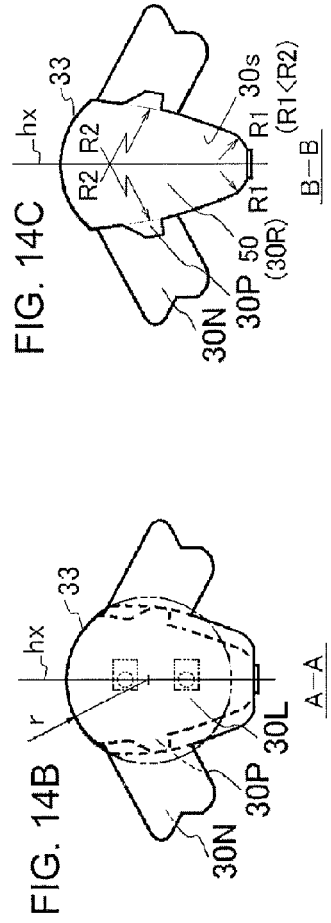
FIG. 14A
FIG. 14B
FIG. 14C

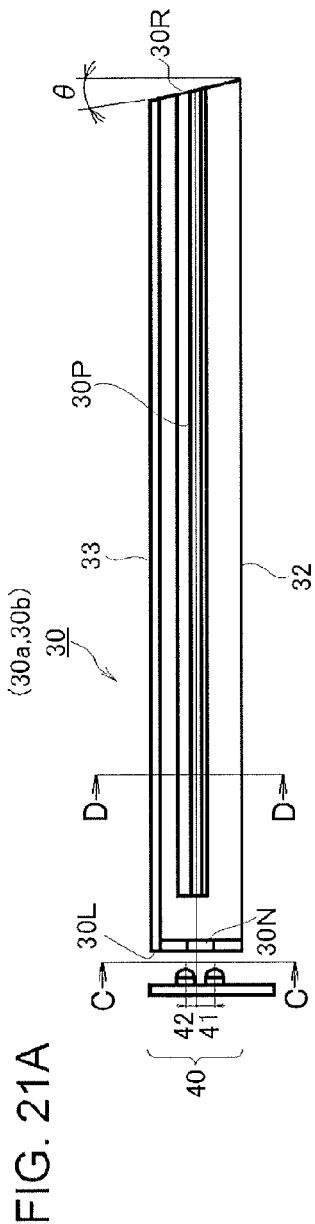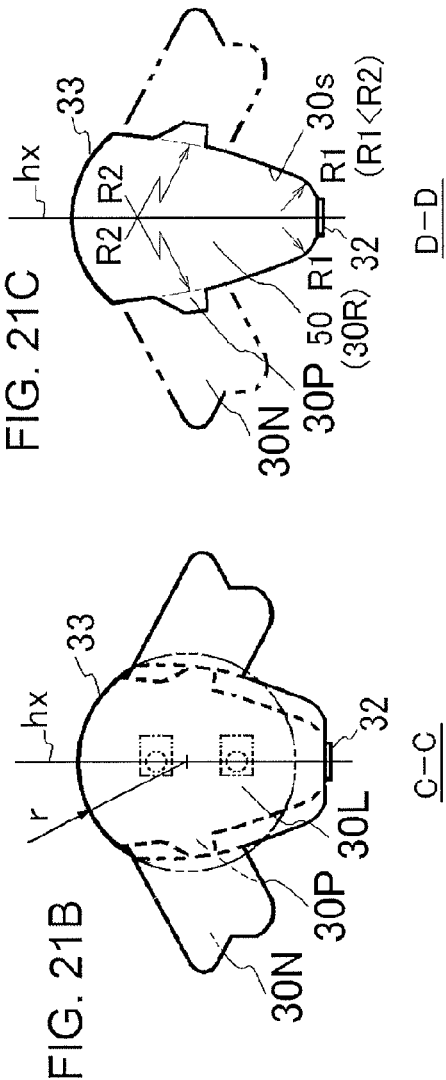

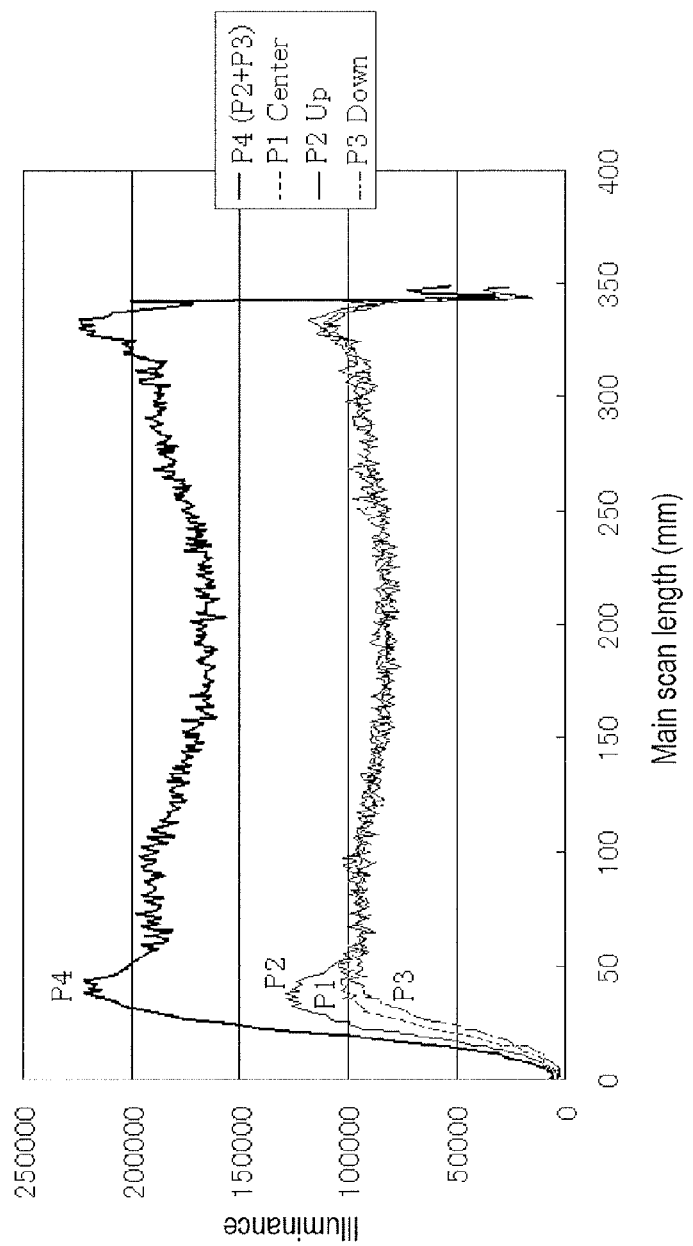

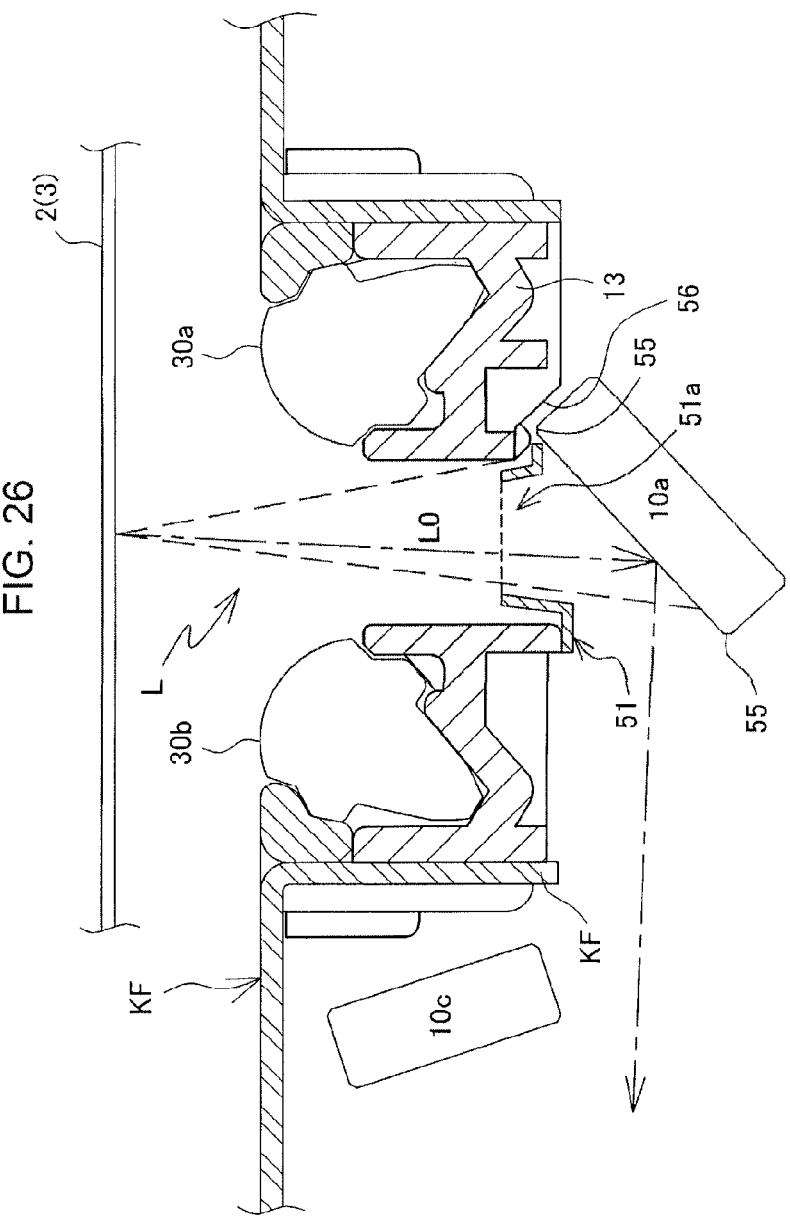

IMAGE SCANNING UNIT

TECHNICAL FIELD

The present invention relates to an image scanning unit of an image reading apparatus, such as a scanner, a copier, a facsimile. The image scanning unit is configured to scan an image of a document or a photograph with an optical instrument to optically read the image.

BACKGROUND ART

An image scanning unit for optically reading an object to be read is mounted in an apparatus that forms an image, such as a scanner or a copier. The image scanning unit includes a light source unit that emits light while moving along a reading surface of the object to be read and a plurality of reflecting members that deflect reflected light from the object to be read to guide the light to an image reading section provided with an image sensor.

In the image scanning unit, the light source unit and a reflected image scanning unit having the reflecting members and image reading section are disposed below a platen glass on which the object to be read is placed or in a casing (carriage frame) that can incorporated inside an ADF (Patent Document 1). The light source unit is disposed at an upper surface side of the carriage frame so as to face the object to be read. The reflected image scanning unit is positioned at a rear surface side of the light source unit and has a first reflecting member that first receives reflected light from the object to be read and a plurality of intermediate reflecting members that deflect reading light received by the first reflecting member a plurality of times so as to guide the reading light to the image reading section. The number and arrangement of the plurality of reflecting members are appropriately determined depending on a shape or a size of the carriage frame and arrangement of the light source unit and image reading section.

The light source unit includes a pair of bar-like light guides extending along a longitudinal direction of the object to be read, a light guide holder that holds the pair of light guides such that they extend parallel to each other, and a pair of light sources (LEDs) disposed so as to face one end portions of the pair of light guides. The light source unit is mounted with the light guide holder incorporated in an upper portion of the carriage frame (Patent Document 2).

In the reflected image scanning unit, the reading light received by the first reflecting member disposed below the light source unit is passed through the other intermediate reflecting members disposed in a space inside the carriage frame, whereby a continuous light path of the reading light toward the image reading section disposed at a bottom portion of the carriage frame is formed.

CITATION LIST

Patent Document

[Patent Document 1] Jpn. Pat. Appln. Laid-Open Publication No. 2001-255601
[Patent Document 2] U.S. Patent Application Publication No. US2001/0050784A1

DISCLOSURE OF THE INVENTION

Problems to be Solved by the Invention

As described above, the reflected image scanning unit positioned at the rear surface side of the light source unit includes the plurality of reflecting members constituting a reduced light path of the reading light, so that there is a need to ensure a large arrangement space in the carriage frame. This makes it difficult to achieve a reduction in size and thickness of the image scanning unit, which in turn inhibits a reduction in size and thickness of a scanner or a copier to be mounted.

The present invention has been made to solve the above problem of the conventional technologies, and an object thereof is to provide an image scanning unit capable of ensuring required light path length even with space-saving design by properly and efficiently arranging the plurality of reflecting members in an effective space of the carriage frame and thus achieving a reduction in overall thickness.

Means for Solving the Problems

To solve the above problem, there is provided an image scanning unit including: a light source unit, including: a light guide which is formed into a rod-like shape extending in a main scan direction and has, at at least one end thereof, an end face for taking in light, a diffuse reflecting surface for diffusely reflecting the light taken in from the end face, and a light exit surface for emitting the light that is diffusely reflected at the diffuse reflecting surface towards an irradiation surface; a light source facing the end face of the light guide; and a light guide holder member holding the light guide; a light receiving section receiving reflected light from the irradiation surface; a plurality of reflecting members forming a reading light path guiding the reflected from the irradiation surface to an image reading section; and a frame housing the light source unit and reflecting members, wherein the frame divides a space facing the irradiation surface into at least two, first and second spaces to form a first housing section for housing a light source unit in the first space and a second housing section for housing at least one of the reflecting members in the second space adjacent to the first space, a first reflecting member first receiving reflected light from the irradiation surface is disposed at a side opposite to the irradiation surface with respect to the first housing section, and a light-shielding member is provided between the first reflecting member and a reflection member positioned in the second space so as to prevent the light from the first reflecting member that has strayed from the reading light path from entering the reflecting member in the second space.

The light-shielding member is constituted by the light guide holder member or a holder retaining member that retains the light guide holder. The light-shielding member is constituted by a side surface of the light guide holder member on the second space side and a bottom surface of the light guide holder member.

The light guide holder member is retained by a holder retaining member formed of a rigid material such as metal, and the holder retaining member has a first reference surface and a second reference surface. The first reference surface extends in the main scan direction and fitted to the light guide holder member so as to contact at least one side surface of the light guide holder member in a longitudinal direction thereof to correct attitude of the light guide holder member, and the second reference surface is used as a reference based on which the light source is disposed opposite to the end face of the light guide and spaced apart therefrom by a predetermined interval.

A housing portion that houses a corner portion of the first reflecting member that is positioned nearest the irradiation surface extending in the scanning direction is formed in a surface of the light guide holder member on a side of the first reflecting member to allow the corner portion housed in the housing portion to serve as a light shield that prevents the reflected light from the irradiation surface from entering the corner portion.

At least one reflecting member is disposed so as to face a reflection reference surface of the first reflecting member with a surface thereof opposite to the reflection reference surface directed to the first reflecting member and disposed at a position on a side of the light source unit with respect to the reading light path of the light reflected from the first reflecting member.

The reflecting member provided in the second space includes, in the second space, a second reflecting member that faces the light-shielding member with a surface thereof opposite to the reflection reference surface directed thereto and a third reflecting member provided at a position more away from the first reflecting member than the second reflecting member from the first reflecting member, and the third reflecting member is disposed at a position more away from a reading light path going from the first reflecting member to its subsequent reflecting member than the second reflecting member from the reading light path.

In the second space, an angle formed between the third reflecting member and the reading light path going from the first reflecting member to its subsequent reflecting member is smaller than an angle formed between the second reflecting member and the reading light path going from the first reflecting member to its subsequent reflecting member.

In the light source unit the holder retaining member includes the first reference surface, second reference surface extending in a direction substantially perpendicular to the first reference surface and serving as a mounting surface of the light source, and a third reference surface that regulates a position of an end portion of the light guide with respect to the light source, and the second reference surface defines the predetermined interval.

The holder retaining member has an opening that houses the light guide holder, and the first reference surface is formed in at least one wall of the opening extending in the longitudinal direction.

The light guide holder member includes a receiving portion in which the light guide is housed, and an outer wall of the receiving portion extending in the longitudinal direction abuts against the wall of the holder retaining member.

The light guide has a flange portion at at least one end thereof in the longitudinal direction, and when the light guide holder is fixed to the holder retaining member, the flange of the light guide housed in the light guide holder member is made to abut against the third reference surface of the holder retaining member to fix a position of the light guide with respect to the light source.

Advantages of the Invention

According to the image scanning unit of the present invention, disposing some reflecting members in an empty space defined in the carriage frame caused in association with incorporation of the light source unit allows narrowing of a space on a rear side of the light source unit. As a result, it is possible to reduce a thickness of the entire image scanning unit, thereby allowing the image scanning unit to be mounted in a downsized scanner or copier without problem.

The reflecting members arranged in the empty space are disposed in an area shielded by the light source unit so that they do not receive directly the reflected light from the object to be read and are disposed with their back turned to a first reflecting member that first receives the reflected light from the object to be read. The reflecting members disposed in the empty space do not receive directly light from the first reflecting member and have a role of relaying secondarily-received light toward the image reading section. Thus, the light shielding by the light source unit can effectively prevent ambient light from being mixed with the relayed light.

That is, inserting the light source unit to set the same in the frame divides a space inside the frame into the light source unit housing portion and reflecting member housing portion and allows a part of the light source unit to have a light shielding function that reduces ambient light going toward at least one reflecting member positioned in the reflecting member housing portion. A part of the light source unit can have the light shielding function simply by setting the light source unit in the frame, thereby eliminating the need to additionally provide a light-shielding member, which results in a reduction in the number of components.

Further, a light path of the reading light formed by the plurality of reflecting members is formed in a range including the empty space in the carriage frame, so that the first reflecting member can be disposed just below the light source unit. This can reduces a distance between the object to be read and first reflecting member that first receives the reflected light therefrom, thereby enhancing reading accuracy. A corner portion of the first reflecting member is made to go into a lower space of the light source unit for light shielding, thereby preventing the corner portion of the reflecting member from being irradiated with the reflected light from the object to be read to prevent occurrence of irregular reflection.

BRIEF DESCRIPTION OF THE DRAWINGS

FIGS. 3A to 3C are views for explaining a means for preventing reflection between light guides, in which FIG. 3A is a main part enlarged view of a first example of the reflection preventing means, FIG. 3B is a main part enlarged view of a second example of the reflection preventing means, and FIG. 3C is a main part enlarged view of a third example of the reflection preventing means.

FIG. 13 is a main part exploded perspective view of the illumination device of FIG. 12.

FIGS. 14A to 14C are main part enlarged views of the illumination device, in which FIG. 14A is a cross-sectional side view, FIG. 14B is an outer appearance view of the light guide as viewed from one end side (luminous body side) thereof, and FIG. 14C is an outer appearance view of the light guide as viewed from the other end side thereof.

FIGS. 15A to 15E are schematic view for explaining a shape of the light guide in the illumination device of FIG. 7, in which FIG. 15A is a main part enlarged perspective view, FIG. 15B is a plan view as viewed from a reflecting surface side, FIG. 15C is a cross-sectional view at a position of a, FIG. 15D is a cross-sectional view at a position of b, and FIG. 15E is a cross-sectional view at a position of c;

FIGS. 20A to 20C are views illustrating structures of the luminous body and a luminous body board in the light source unit of FIG. 19, in which FIG. 20A is a plan view illustrating a light power source supply circuit wiring pattern on the luminous body board, FIG. 20B is a cross-sectional view taken along a line Z-Z, and FIG. 20C is a plan view illustrating a terminal pattern of the light source.

FIGS. 21A to 21C are views for explaining a positional relationship between the luminous body and light guide in the illumination device of FIG. 13, in which FIG. 21A is a side view, FIG. 21B is a plan view illustrating a position of the luminous body with respect to the light guide as viewed from the one end (luminous body side) of the light guide, and FIG. 21C is a plan view illustrating the position of the luminous body as viewed from the other end side of the light guide.

FIGS. 23A to 23C, which correspond to FIGS. 21A to 21C, respectively, are views for explaining a positional relationship between the luminous body and light guide in the illumination device of another embodiment, in which FIG. 23A is a side view, FIG. 23B is a plan view illustrating a position of the luminous body with respect to the light guide as viewed from the one end (luminous body side) of the light guide, and FIG. 23C is a plan view illustrating the position of the luminous body as viewed from the other end side of the light guide.

FIG. 24 is a chart view showing spectral characteristics of the illumination device in the image reading device of the present invention.

FIG. 26 is an enlarged view illustrating arrangement of a light guide holder and a first reflecting member in the reading carriage of FIG. 2.

MODE FOR CARRYING OUT THE INVENTION

Hereinafter, the entire configuration of an image reading device according to the present invention, equipped with an illumination device, a modification of the image reading device of the present invention, spectral characteristics of the illumination device in the image reading device of the present invention, and an image data processing section that reads a document image in the image reading device of the present invention will be described based on FIGS. 1 to 22, FIG. 23, FIG. 24, and FIG. 25, respectively.

[Embodiment of Image Reading Device]

Figure 1:
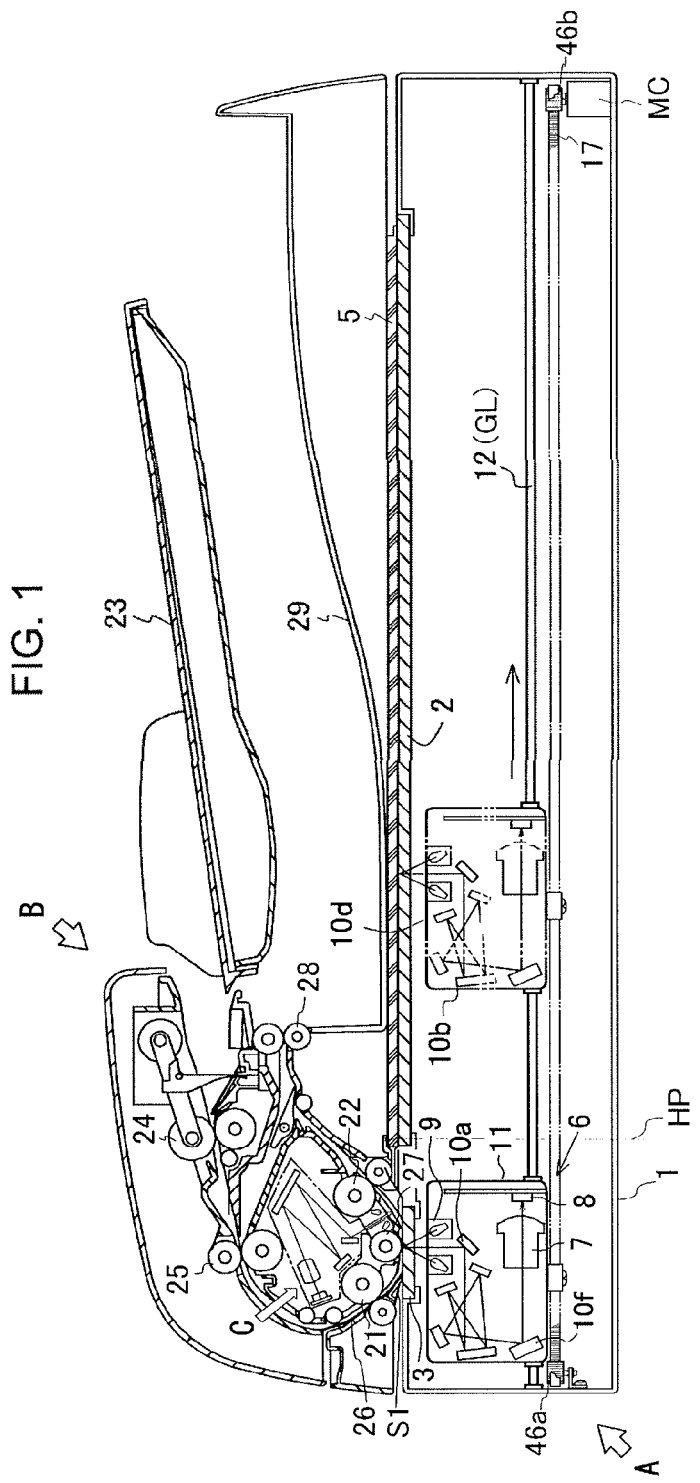
FIG. 1 is a cross-sectional view illustrating the entire configuration of an image reading device according to the present invention.

First, an embodiment of an image reading device according to the present invention, equipped with an illumination device will be described based on FIGS. 1 to 22. FIG. 1 is a view for explaining the entire configuration of the image reading device. FIGS. 2 to 6 are views for explaining a configuration of a reading carriage that is mounted in the image reading device and configured to read a document image. FIGS. 7 to 15 are views for explaining a illumination device serving as a light source of the reading carriage. FIGS. 17 to 22 are views for explaining a configuration of a light source unit of the illumination device. In particular, FIGS. 3A to 3C are views for explaining in detail embodiments of a reflection preventing means for preventing reflection between light guides according to the present invention, in which FIG. 3A illustrates a first embodiment of the reflection preventing means for preventing reflection between the light guides, FIG. 3B illustrates a second embodiment of the reflection preventing means for preventing reflection between the light guides, and FIG. 3C illustrates a third embodiment of the reflection preventing means for preventing reflection between the light guides.

<Entire Configuration of Image Reading Device>

FIG. 1 is a cross-sectional view illustrating the entire configuration of the image reading device. The image reading device includes an image scanning unit A to be described below and a document feeding unit B mounted on the image scanning unit A.

(Image Scanning Unit A)

The image scanning unit A includes, in a device housing 1, a first platen 2 and a second platen 3. The First and second platens 2 and 3 are each formed of a transparent material such as a glass and each fixed to a top portion of the device housing 1. The first platen is formed to have a dimension corresponding to a maximum dimensional size of a document to be set manually thereon, and the second platen 3 is formed to have a width corresponding to a maximum width size of the document that can be used so as to allow reading of the document fed at a predetermined speed. The first and second platens 2 and 3 are arranged side by side in a line, and a reading carriage 6 is incorporated therebelow. The reading carriage 6 is reciprocated by a carriage motor Mc in a state where it is supported inside the device housing 1 so as to be movable in parallel to a platen surface while being guided, at a lower portion thereof, by a guide shaft 12 and a rail member GL.

(Document Feeding Unit B)

The document feeding unit B is disposed above the first and second platens 2 and 3 so as to cover the first and second platens 2 and 3 and includes a lead roller (document feeding means) 21 that feeds a document sheet to the second platen 3 and a takeout roller 22. Further, there are disposed on an upstream side of the lead roller 21a sheet supply stacker 23 in which document sheets are housed in a stacked state, a sheet supply roller 24 that separately feeds the sheets stacked in the sheet supply stacker 23 one by one, and a pair of resist rollers 25 that correct skew of a leading end of the sheet that is separately fed. Further, a lead sensor Sl that detects the leading end of the document to be fed toward the second platen 3 is provided on a sheet supply path 26 that guides the document sheet from the sheet supply stacker 23 to second platen 3, and a backup roller 27 is disposed on an upper surface of the second platen 3. The backup roller 27 rotates at the same circumferential speed as the lead roller 21 to cause the document sheet to be fit onto the second platen 3 and feeds the document sheet to the takeout roller 22 disposed on a downstream side of the platen. Further, there are disposed on a downstream side of the takeout roller 22, a discharge roller 28 and a discharge stacker 29. The discharge stacker 29 is disposed below the sheet supply stacker 23 in parallel thereto in a vertical direction. Further, there is provided at a bottom of the discharge stacker 29 a platen ten cover 5 that holds the document sheet placed on the first platen 2 while pressing the document sheet.

<Double-Side Reading Mechanism>

Further, there is provided, inside a document reverse path guide formed by the resist roller pair 25, lead roller 21, backup roller 27, and takeout roller 22, an image scanning unit C that reads substantially simultaneously a rear surface of a document surface read by the image scanning unit A. Details of the image scanning unit C will be described later.

In place of the backup roller 27, a backup guide may be disposed above the platen. Further, although the image reading device described as the first embodiment has a configuration in which the document feeding unit B is mounted on the first and second platens 2 and 3 arranged side by side in a line, it may be configured such that the only the first platen 2 is used (second platen 3 is removed) and that an access cover is attached in place of the document feeding unit B so as to cover the first platen 2.

(Document Fixed-Reading Mode <Flat Bed Mode>)

For the image reading device having the above configuration, an operator selects a document fixed-reading mode, so-called a flat bed mode on a device panel of the image scanning unit A or a screen of a PC. In a case where the document sheet set on the first platen 2 is read, the operator pulls upward the document feeding unit B openably mounted to the device housing 1 of the image scanning unit A, places the document sheet on the exposed first platen 2, and brings down the platen cover 5 of the document feeding unit B to cover the document sheet. The reading carriage 6 moves along the guide shaft 12 below the document sheet to perform document sheet reading operation.

(Document Pass-Through Reading Mode <Sheet-Through Mode>)

In a case where the operator selects a document pass-through reading mode, so-called a sheet-through mode on the device panel of the image scanning unit A or the PC screen for reading of the document sheet fed on the second platen 3 by the document feeding unit B, reading operation of the document sheet fed by the document feeding unit B is performed in a state where the reading carriage 6 is moved along the guide shaft 12 to a reading position on the second platen 3 by the carriage motor Mc and stopped there.

<Configuration of Reading Carriage>

Next, the reading carriage 6 will be described.

First, based on FIG. 2, the entire configuration of the reading carriage 6 will be described. The reading carriage 6 includes an illumination unit 9 (illumination device) and a unit frame 11 constituting an optical unit. The unit frame 11 is formed of a heat resistant resin and a metal plate and, as illustrated, an entire frame body of the illumination unit 9 is completely housed in a top portion of the unit frame 11 facing the first and second platens 2 and 3. That is, there is formed a concave portion that houses the illumination unit 9 such that a top portion of the unit frame 11 and an upper surface of the frame body of the illumination unit 9 constitute a flat surface, and the illumination unit 9 is detachably mounted in the concave portion.

The illumination unit 9 includes a pair of first and second illumination units 9a and 9b, a light guide housing portion 13 (light guide holder), and a rigid body KF. The light guide housing portion 13 (light guide holder) houses the pair of first and second illumination units 9a and 9b. The rigid body KF is formed of metal or a material equivalent to metal so as to eliminate warpage of the light guides 9a, 9b and light guide housing portion 13 caused in molding time or due to aging. The optical unit includes: a reflecting mirror 10 including first to sixth mirrors 10a to 10f each deflecting reflected light from the document sheet illuminated by light of the illumination unit 9; a condenser lens 7 that condenses the reflected light from the document sheet and then reflected from the reflecting mirror 10; and a line sensor B (image pickup element) disposed at an image forming part at which an image is formed by the condenser lens 7, thereby constituting a reduction optical system. The optical unit is electrically connected to an image processing section (data processing board) to be described later through a not illustrated data transfer cable so as to allow image data output from the line sensor 8 as an electric signal to be transferred to the image processing section. It is optimum, as to a depth of the concave portion in which the illumination unit 9 is housed, that the fourth mirror 10d that sandwiches a reflection area between the first and second mirrors 10a and 10b with the third mirror 10c can be kept within a lateral space formed by the concave portion, as illustrated in FIG. 2. This eliminates formation of an unnecessary space and allows effective use of a space inside the optical unit, thereby reducing a size of the entire device. Further, a bottom portion end surface of the rigid body KF or a bottom portion of the light guide housing portion 13 constituting the frame body of the illumination unit 9 is positioned within a light path L between the first mirror 10a and second mirror 10b. This restricts spreading of the reflected light traveling from the first mirror 10a to second mirror 10b and, in particular, blocks the light reflected by the first mirror 10a from entering directly the fifth mirror 10e.

Figure 2:
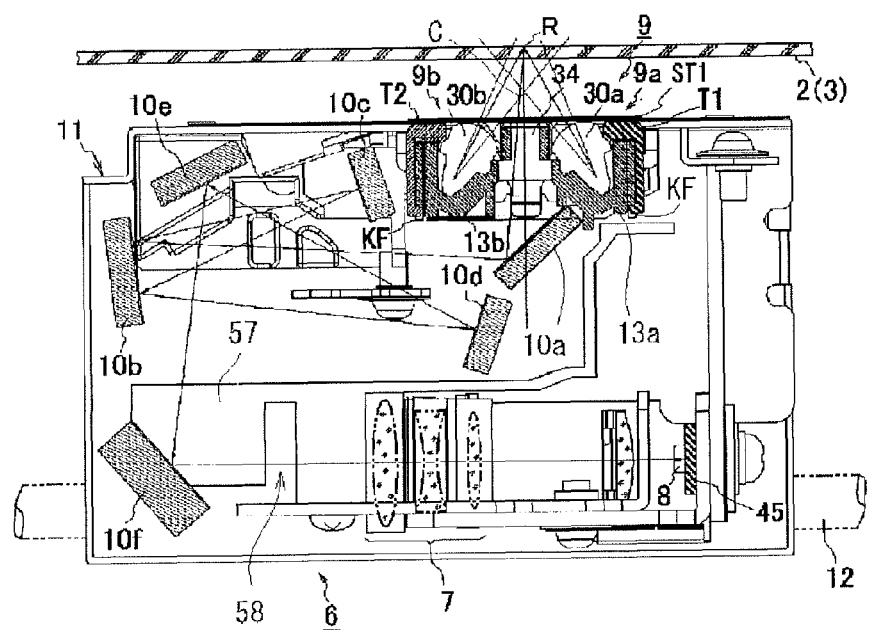
FIG. 2 is a cross-sectional view illustrating a reading carriage that reads a document image in the image reading device of FIG. 1.
Figure 3A:
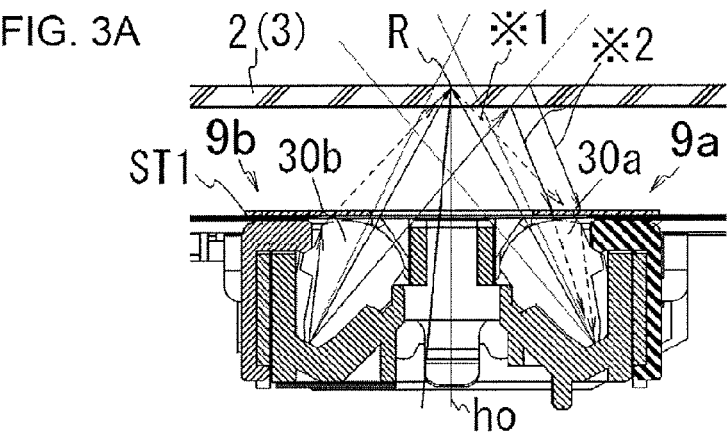
Figure 3B:
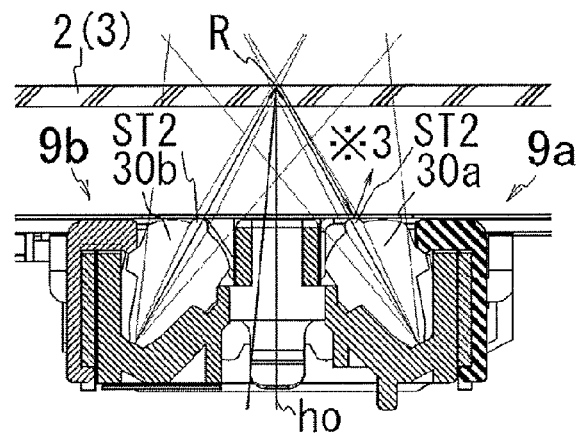
Figure 3C:
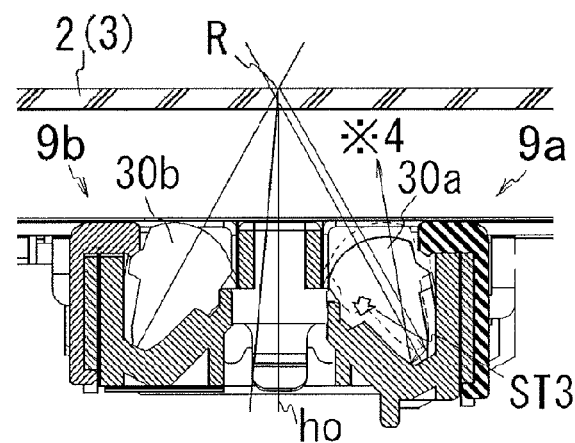
Figure 4:
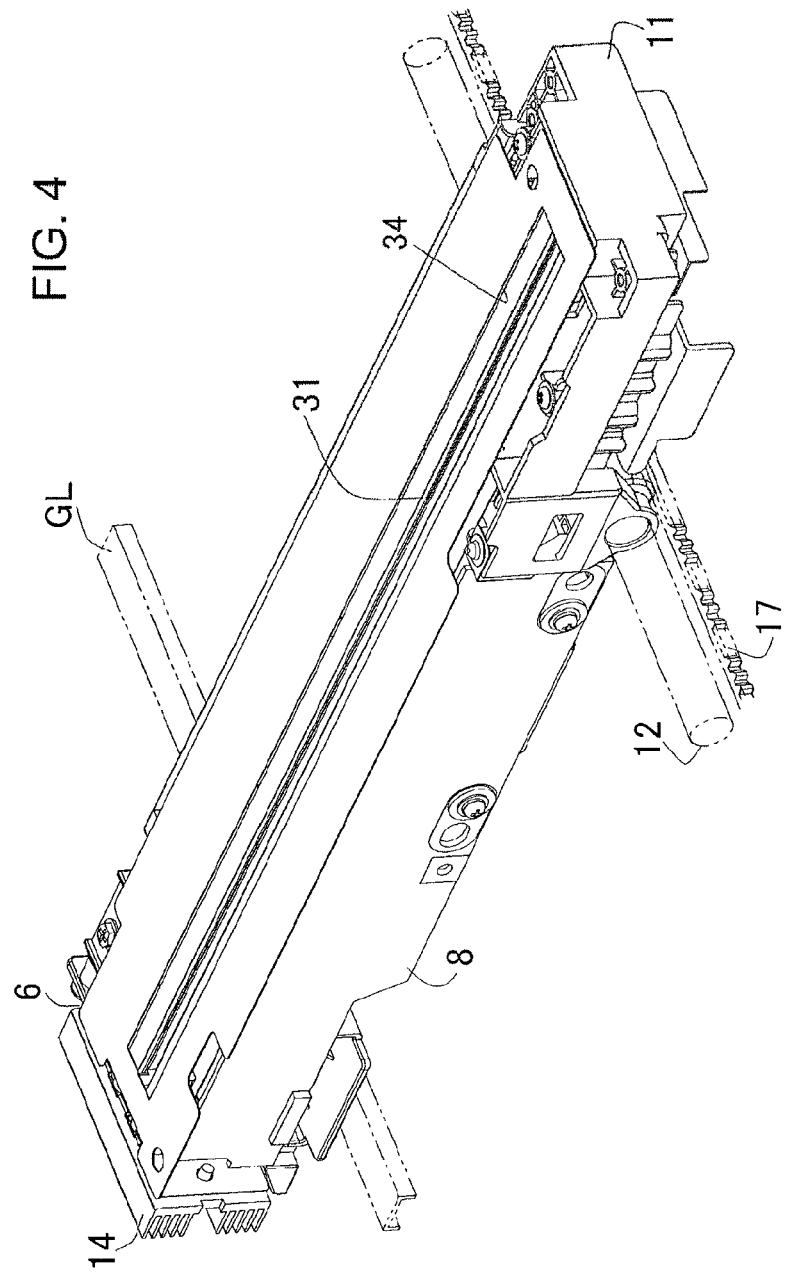
FIG. 4 is a perspective view of an outer structure of a carriage in the image reading device of FIG. 1, as viewed from above.

A reading aperture 34 corresponding to a reading line width W of the document sheet is formed in the illumination unit 9 housed in concave portion of the unit frame 11 as illustrated in FIGS. 2 and 4. The light reflected from the reading surface of the document sheet which is irradiated with the light from the illumination unit 9 is passed through this reading aperture 34 to be received by the line sensor 8 provided in the unit frame 11. The unit frame 11 is movably supported by the guide shaft 12 and rail member GL so as to be reciprocated at a predetermined stroke.

Although being described later in detail as an illumination device of the invention, the illumination unit 9 is constituted by a linear light source that emits linear light along the reading aperture 34, detachably mounted in the concave portion of the unit frame 11 by screws or the like for the purpose of facilitating maintenance of an illumination system, and irradiates the document sheet placed on the platen to be described later with reading light through the reading aperture 34.

The reflecting mirror 10 includes a plurality of mirrors so as to form a light path having a predetermined length. In the present embodiment, the reflecting mirror 10 includes six mirrors. The first mirror 10a reflects the reflected light from the document surface of the document sheet toward the second mirror 10b, and the second mirror 10b reflects the reflected light from the first mirror 10a toward the third mirror 10c. Further, the third mirror 10b reflects the reflected light from the second mirror 10b toward the second mirror 10b once again, the second mirror 10b reflects the reflected light from the third mirror 10c toward the fourth mirror 10d, and the fourth mirror 10d reflects the reflected light from the second mirror 10b toward the fifth mirror 10e. Finally, the fifth mirror 10e guides the reflected light from the fourth mirror 10d to the sixth mirror 10f, and the sixth mirror 10f guides the reflected from the fifth mirror 10e to the condenser lens 7. The light path of the reflected light of the document image is not limited to this. For example, it is possible to use only two mirrors (e.g., first and second mirrors) for formation of the light path.

The first mirror 10a has a first reflecting surface that receives first the reflected light of the document image that passes through a gap between first and second housing portions 13a and 13b of the light guide housing portion 13. Although not illustrated, a chamfered portion 55 is formed in each of corner portions of each of the first to six mirrors 10a to 10f for safety's sake. The chamfered portion 55 is a plane having a different inclination from the reflecting surface of the mirror, so that if the reflected light of the document image enters the chamfered portion 55, the light may enter once again the document image surface from the chamfered portion, causing the light to be irregularly reflected inside and outside the carriage, which adversely affects the read image. Even when the chamfered portion is not formed, there is a possibility that the light is irregularly reflected at the corner portion of the mirror to adversely affect the reading light path L. In order to prevent this, the corner portion of the first mirror 10a nearest the document image is brought close to the document image side to be located at a position upward from the bottom surface of the first housing portion 13a of the light guide housing portion 13. That is, a cut portion 56 is formed on a side of the first housing portion 13 of the light guide housing portion 13 that is opposite to the document image side, and the chamfered portion 55 of the first mirror 10a is disposed so as to be housed in the cut portion 56. With this configuration, a lower portion of the first housing portion 13a serves as a light shielding portion. The light shielding portion is formed on a side opposite to a traveling direction of the light on the light path L passing through the pair of light guide housing portions 13 and houses the chamfered portion or corner portion of the first mirror 10a that faces the illumination unit 9. As a result, reflected light of the document image is shielded by the light guide housing portion 13 to prevent the reflected light from entering the chamfered portion 55. This in turn prevents the irregularly reflected light from occurring at the chamfered portion to thereby prevent deterioration of reading quality. Further, attachment of the corner portion of the first mirror 10a on the reflecting surface side that is nearer the reading surface to a concave portion of the light guide housing portion 13 allows the first mirror 10a to be disposed nearer the light guide housing portion 13, thereby reducing a thickness of the unit frame 11. Although not illustrated, the light guide housing portion 13 has a vibration absorbing rubber so as to prevent vibration of the first mirror 10a. Contact between the vibration absorbing rubber and a part of the first mirror 10a suppresses the vibration of the first mirror 10a, whereby the read image is unlikely to be adversely affected.

The bottom portions of the pair of first and second housing portions 13a and 13b of the light guide housing portion 13 are positioned in a direction more away from the document image surface than the reading aperture 34, allowing the reflected light of the document image passing through the reading aperture 34 to be guided to the reflecting surface of the first mirror 10a. In this regard, as illustrated in FIG. 26, by providing a condenser frame 51 which is formed, separately from the light guide housing portion 13, in the reading aperture 34 on a side thereof away from the document image surface and which has an aperture portion 51a for narrowing an irradiation range of the reflected light, it is possible to prevent the reflected light of the document image from entering the chamfered portion 55 of the first mirror 10a. Further, in the present embodiment, the reflection light path L is not formed on a back side of the first mirror 10a. That is, the formation of the light shielding means 56 allows the light guide housing portion 13 and first mirror 10a to be continuous with each other to eliminate a gap therebetween. This can effectively prevent leakage of light to the line sensor 8.

The condenser lens 7 includes a single or a plurality of concave-convex lenses and condenses the reflected light from the document surface of the document sheet which is transmitted through the reflecting mirror 10 and forms an image on the line sensor 8.

The line sensor 8, which is a CCD or a C-MOS, includes photoelectric conversion sensor elements arranged on a line, and receives the reflected light of the document image transmitted from the condenser lens 7 for photoelectric conversion. The line sensor 8 used in the present embodiment includes a color line sensor, in which four lines of sensor elements constituting respective pixels of R (Red), G (Green), B (Blue), and BW (Black and White) are arranged in parallel four lines. The line sensor 8 having such a configuration is mounted to a sensor circuit board 95, and the sensor circuit board 45 is fixed to the unit frame 11.

<Support Mechanism of Reading Carriage>

Figure 5:
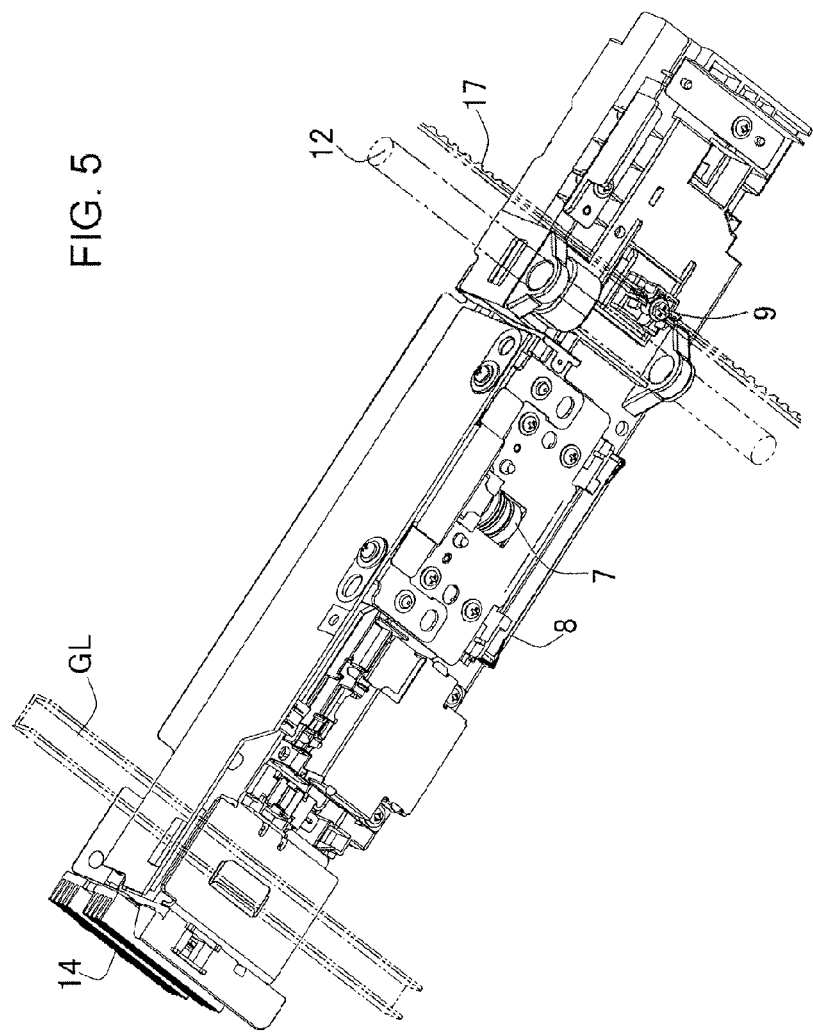
FIG. 5 is a perspective view of the outer structure of the carriage of FIG. 4, as viewed from below.
Figure 6:
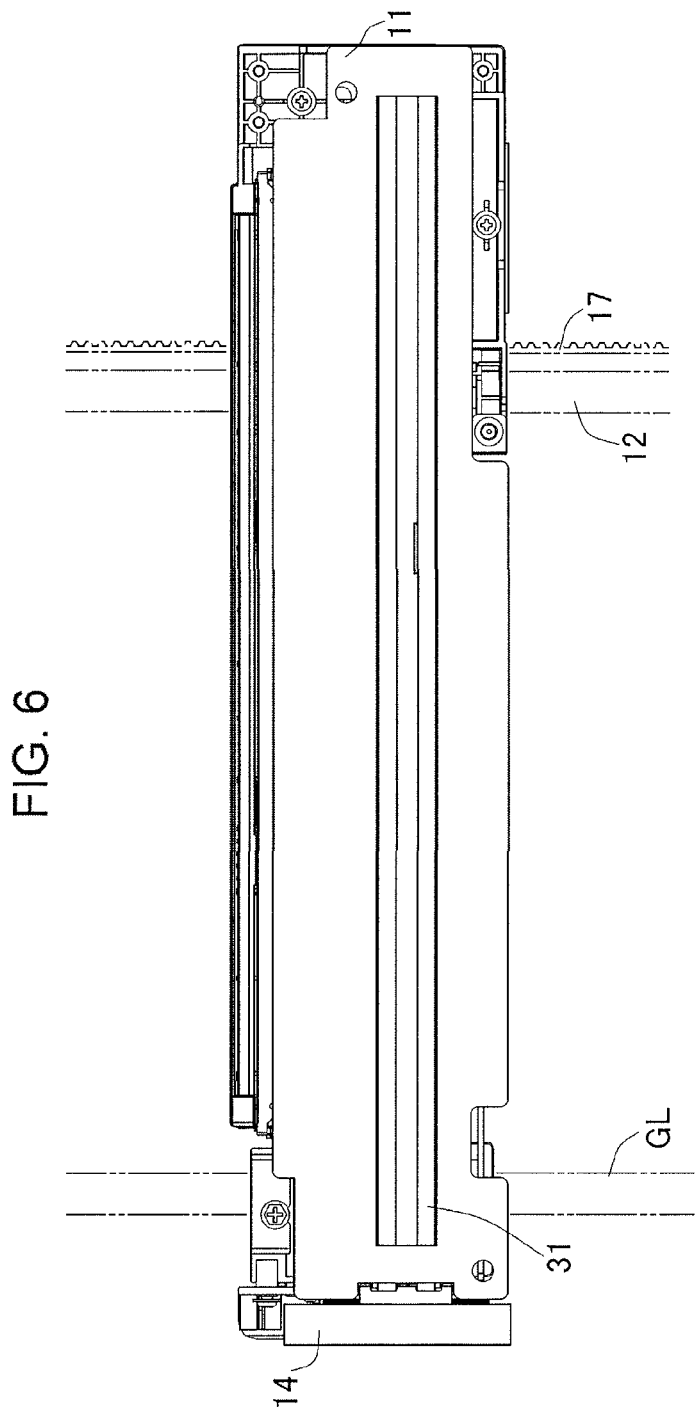
FIG. 6 is a plan view of the outer structure of the carriage of FIG. 4, as viewed from above.

As illustrated in FIGS. 4 to 6, the reading carriage 6 is supported so as to be freely reciprocated with respect to the device housing 1 with one end thereof supported, at a bearing formed in the device housing 1, by means of the guide shaft 12 and the other end thereof slidably supported on the rail member GL. A carriage support mechanism including the guide shaft 12 and rail member GL extends in parallel to the device housing 1. Further, the carriage support mechanism is mounted in parallel to both flat surfaces of the first and second platens 2 and 3 so as to allow the reading carriage 6 to be stably reciprocated at a position facing the flat surfaces of the first and second platens 2 and 3 in parallel thereto.

<Movement Mechanism of Reading Carriage>

A carriage movement mechanism of the reading carriage 6 includes the carriage motor Mc (FIG. 1) which is a drive motor such as a pulse motor or an encoder-equipped DC motor, a tractive member 17, such as a wire or a timing belt, that is rotated by receiving reciprocative rotation of the carriage motor Mc, and a pair of pulleys 46a and 46b rotatably supported by the device frame 1. The forward/reverse rotatable carriage motor Mc is connected to the pulley 46b, the tractive member 17 is provide in a tensioned state between the pair of pulleys 46a and 46b, and the reading carriage 6 is connected to the tractive member 17, thereby achieving the carriage movement mechanism.

<Reading Operation of Reading Carriage>

At power-on time or reading completion time, the reading carriage 6 connected to the above-described carriage movement mechanism is stopped at a home position HP (FIG. 1), i.e., a position where a not illustrated shading plate having a predetermined range of reference white (and reference black, as needed) for regulating light intensity characteristics and provided above the home position HP is illuminated by the light from the illumination unit 9. Depending on the selected mode, the reading carriage 6 changes its position for reading operation. That is, when the document pass-through reading mode is selected, the reading carriage 6 moves from the home position HP to a position denoted by a continuous line of FIG. 1; and when the document fixed-reading mode is selected, the reading carriage 6 moves from the home position HP to a position denoted by a long dashed double-short dashed line of FIG. 1.

<Configuration of Illumination Device>

Next, the illumination device mounted to the above-described reading carriage 6 and used as the illumination unit 9 will be described based on FIGS. 7 to 22.

Figure 10:
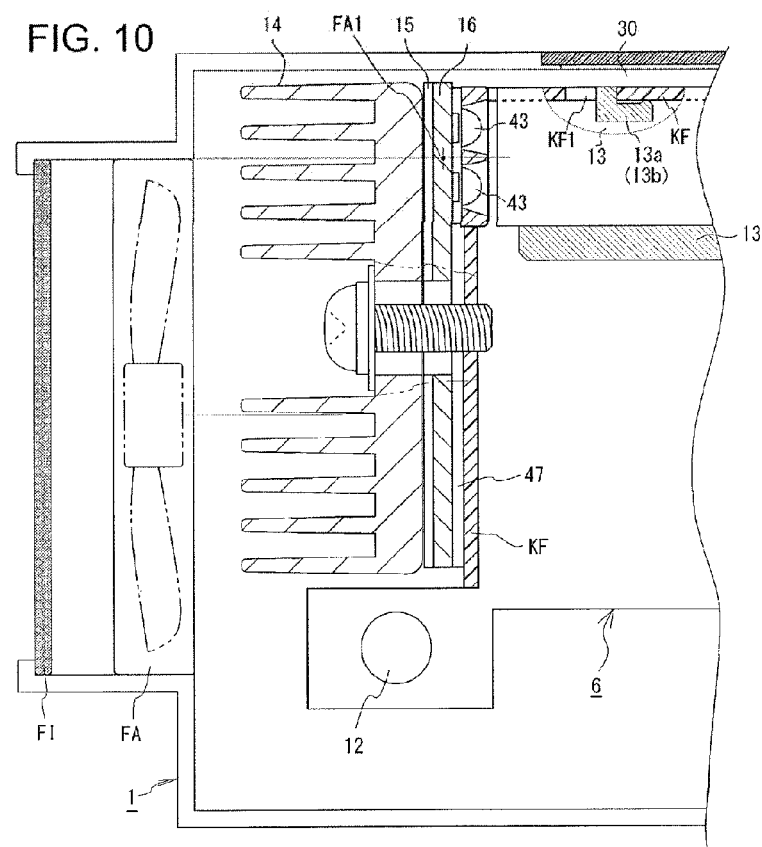
FIG. 10 is a simple side view for explaining a positional relationship between a cooling fan of FIG. 8 and illumination device mounted on the carriage.
Figure 11:
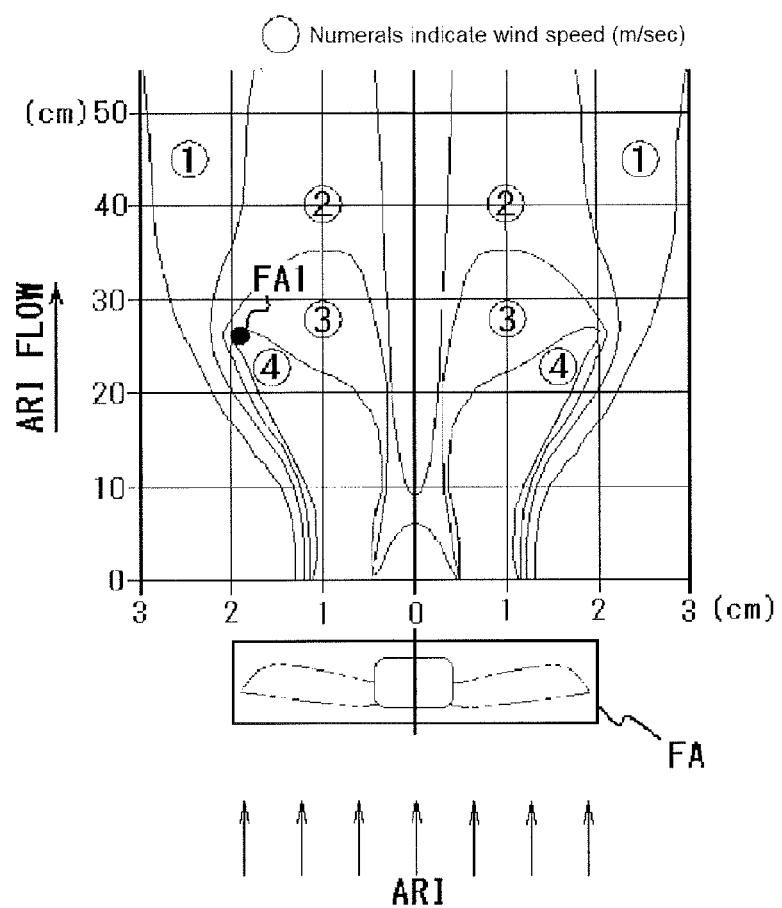
FIG. 11 is a chart view showing wind speed characteristics of the cooling fan used for the illumination device of FIG. 8.
Figure 12:
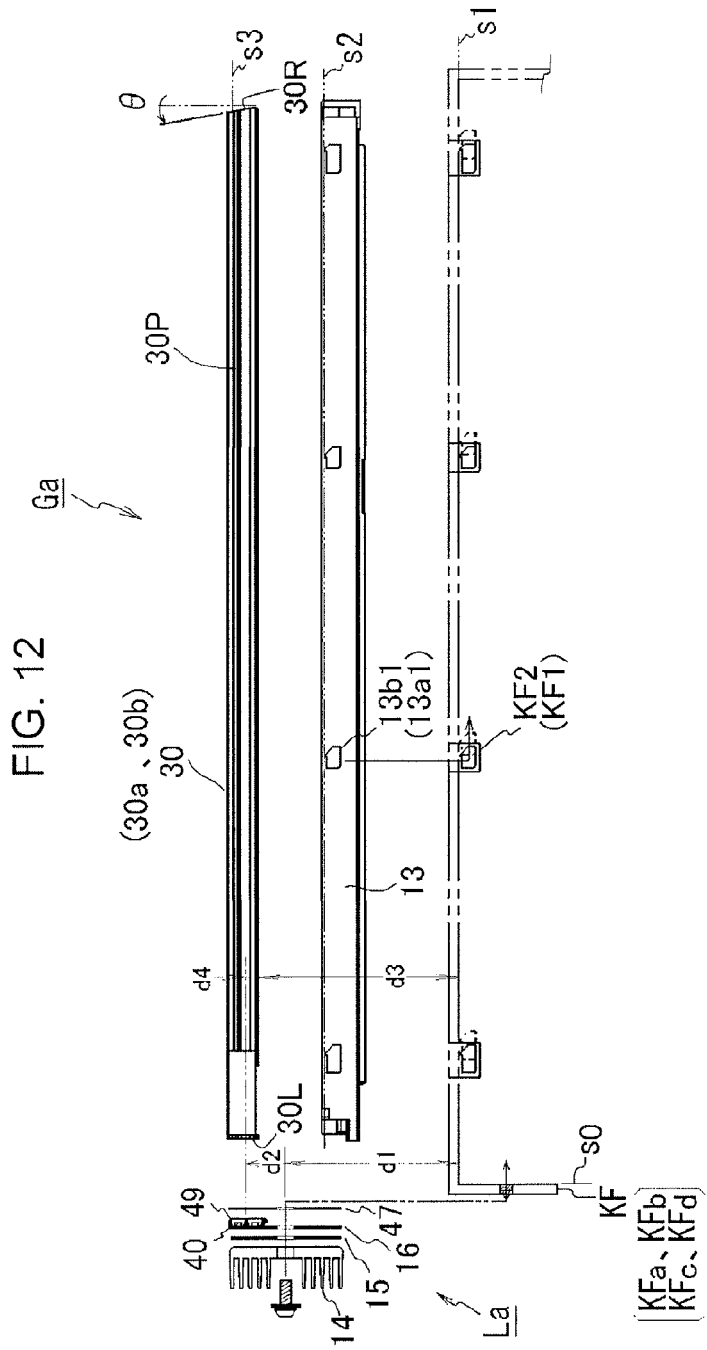
FIG. 12 is a main part exploded perspective side view of the illumination device to be mounted on the carriage of FIG. 4.

The illumination unit 9 constituting the illumination device emits linear light along a reading line perpendicular to a reading surface R of FIG. 2 and having a reading width in a main scan direction. As illustrated in FIGS. 7 to 15, the illumination unit 9 includes a light guide unit Ga and a light source unit La. The light guide unit Ga includes the first and second illumination units 9a and 9b illustrated in FIG. 2. The first and second illumination units 9a and 9b are housed in the respective first and second housing portions 13a and 13b formed in the light guide housing member (light guide holder) 13 held, through light guide retaining members T1 and T2, by the rigid body KF which is formed of metal and which is fixed by screws and the like to the unit frame 11 of the carriage 6 illustrated in FIG. 2. As illustrated in FIG. 12, one end of each of the first and second illumination units 9a and 9b is disposed so as to face each of luminous bodies 40 of the light source unit La supporting the luminous bodies 40. Hereinafter, a configuration of the light source unit La and that of the light guide unit Ga will be described in detail.

<Configuration of Light Source Unit>

Figure 7:
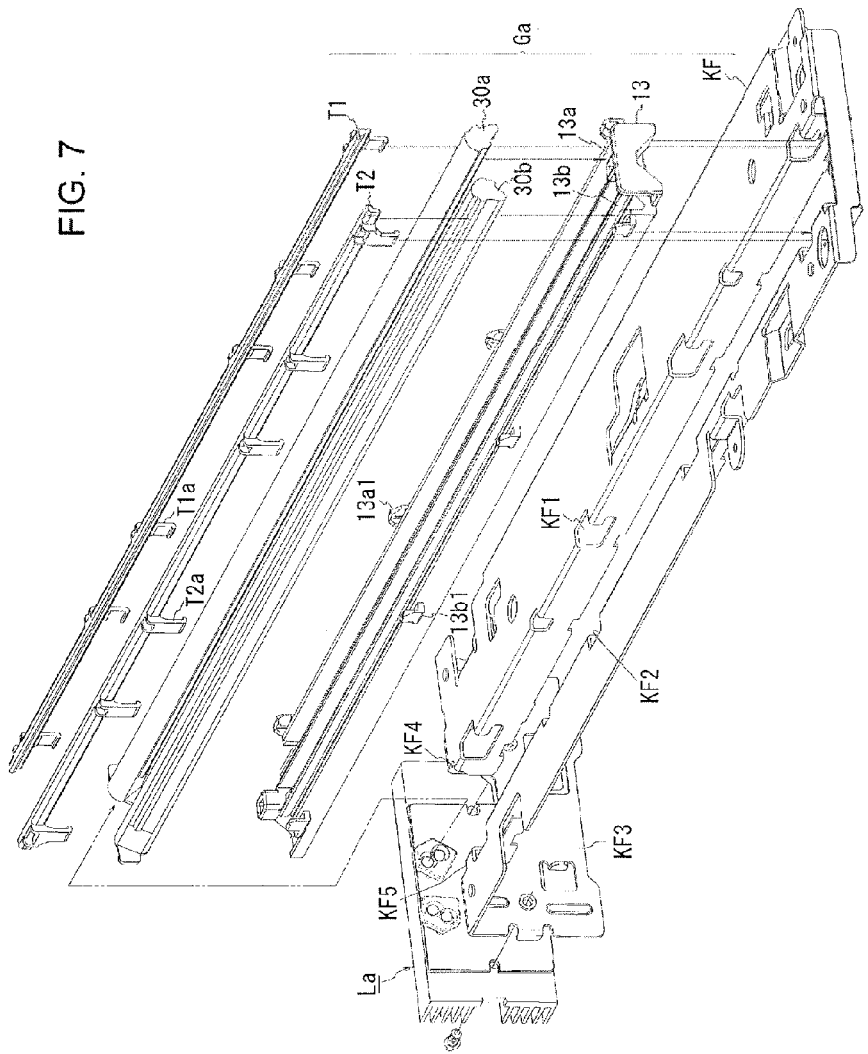
FIG. 7 is an exploded perspective view of an illumination device to be mounted on the carriage of FIG. 4.

As illustrated in FIG. 13, the light source unit La includes a heat radiating member 14, a heat conductive sheet 15, a circuit board 16, and an insulating Mylar 47 and is mounted by screws or the like to the rigid body KF formed of metal or a material equivalent to metal illustrated in FIG. 7. There are mounted to the circuit board 16 a first luminous body (white LED) 41 and a second luminous body (white LED) 42. Lens caps 43 are attached respectively to the first and second luminous bodies 41 and 42, and the resultant first and second luminous bodies 41 and 42 are covered with a reflector 49 from above. The insulating Mylar 47 provides insulation to a portion other than that covered with the reflector 49. Hereinafter, descriptions will be given of respective components and assembly of the unit.

(Luminous Body)

Figure 18:
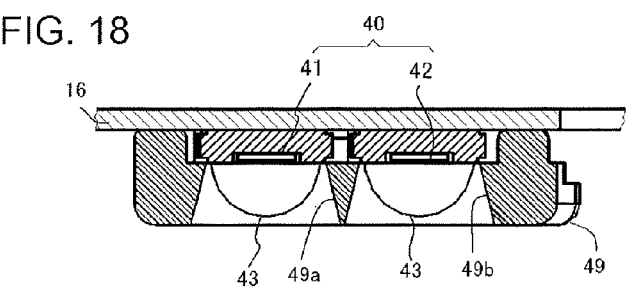
FIG. 18 is a cross-section enlarged view of the light source unit of FIG. 17.
Figure 19:
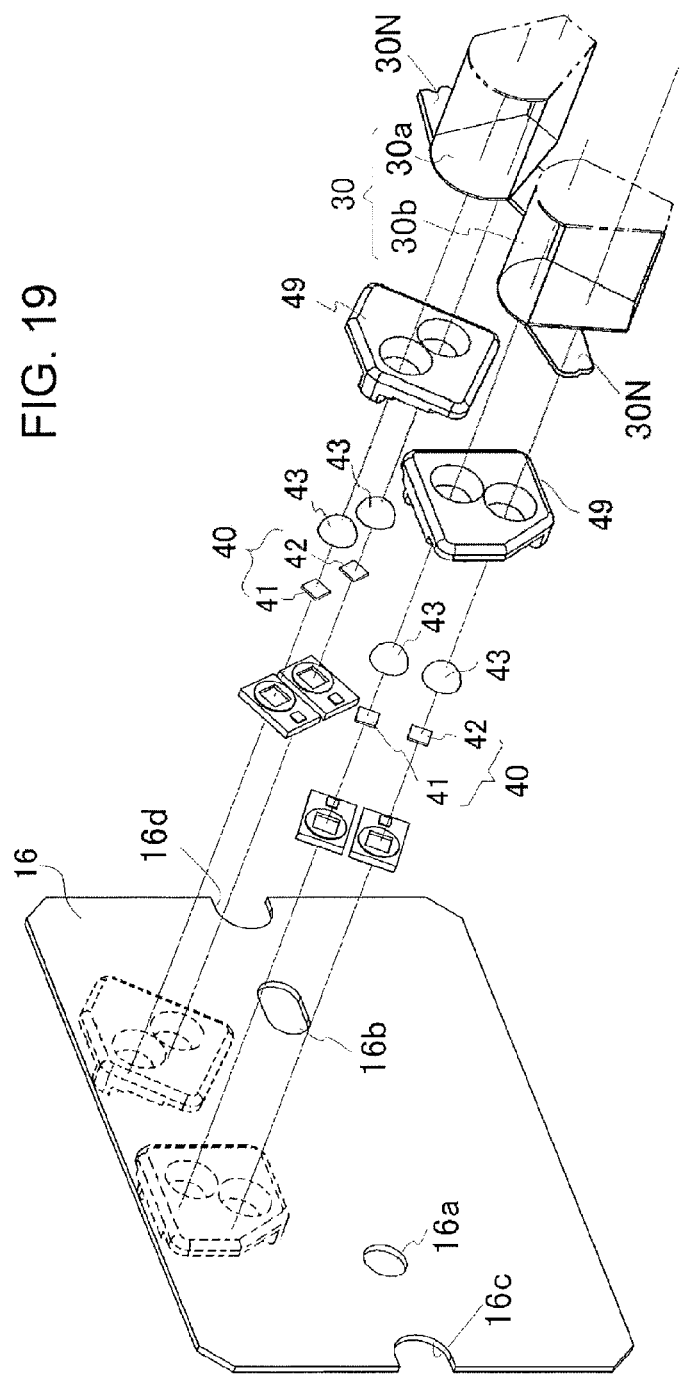
FIG. 19 is an exploded perspective view of the light source unit of FIG. 18.
Figure 20A:
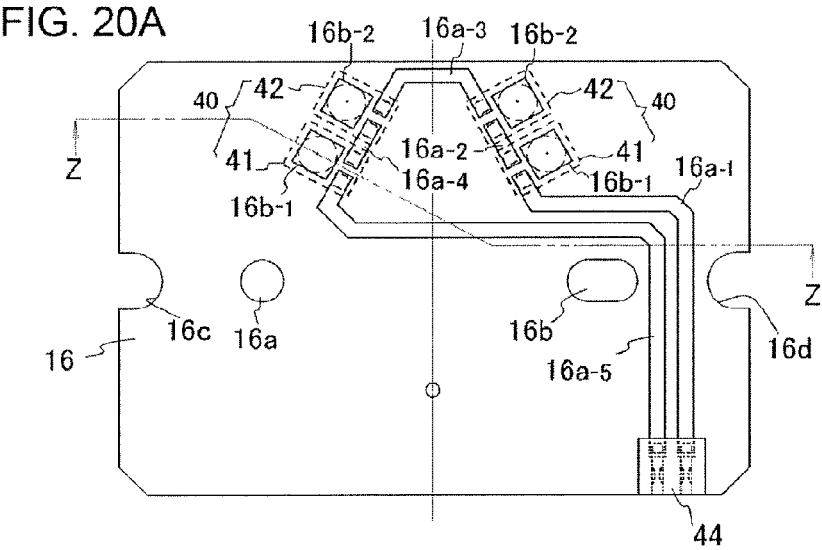

The luminous body 40 will be described based on FIGS. 17 to 20. The luminous body 40 includes left and right pair, each of which includes two light emitting elements: a first luminous body 41 and a second luminous body 42. The light emitting elements are each formed of a white LED chip. Further, as illustrated in FIG. 20C, the luminous body 40 has an anode 40a and a cathode 40b which are formed for power delivery and a thermal pad 40 for heat radiation and is electrically mounted on a wiring pattern of the circuit board 16.

(Circuit Board)

Figure 20B:
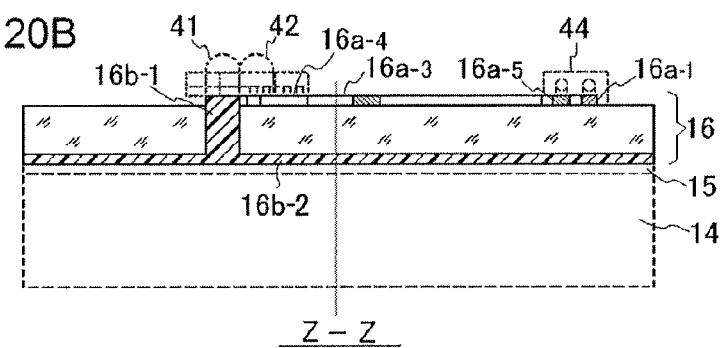
Figure 20C:
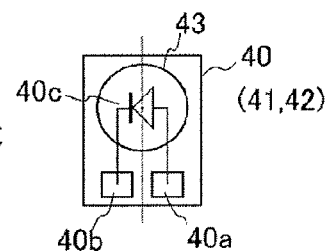

The circuit board 16 on which the luminous body 40 is mounted is, as illustrated in FIG. 20B, fixed to the heat radiating member 14 through the heat conductive sheet 15, and the luminous body 40 is mounted on the circuit board 16. As illustrated in FIG. 20A, there are formed, on a front surface of a substrate of the circuit board 16, wiring patterns 16a-1 to 16a-5 each of which is formed of a material excellent in conductivity, such as copper, silver, or gold, for energizing the luminous body 40 for light emission. A rear surface of the substrate of the circuit board 16 is covered with a heat conductive layer 16b-2 formed of a material excellent particularly in heat conductivity, such as copper, silver, or aluminum. In addition, there is formed, on the substrate front surface of the circuit board 16, a projecting portion 16b-1 so as to bring a part of the heat conductive layer into direct contact with an emission source of the luminous body 40. The circuit board 16 is formed as follows. That is, a through hole for forming the projecting portion 16b-1 is formed on an insulating substrate formed of an epoxy material, a heat conductive material excellent particularly in heat conductivity, such as copper, silver, or aluminum is injection-molded to form the heat conductive layer 16b-2 and projecting portion 16b-1 on a rear surface of the insulating substrate, a layer formed of a material excellent in excellent in conductivity, such as copper, silver, or gold is formed on a front surface of the substrate, and the substrate front surface is etched to leave the wiring patterns 16a-1 to 16a-5 and projecting portion 16b-1. Then, when the luminous body 40 is mounted on the circuit board 16, the thermal pad 40c of the luminous body 40 and projecting portion 16b-1 projecting from the rear surface of the substrate are brought into press contact with each other, allowing heat generated at lighting time of the luminous body 40 to be radiated to the heat conductive layer 16b-2 on the rear surface of the substrate through the projecting portion 16b-1 contacting the thermal pad 40c.

The circuit board 16 can be formed in a multi-layer structure; in this case, however, it is desirable that the heat conductive layer 16b-2 on the rear surface and projecting portion 16b-1 projecting to the substrate front surface are connected to each other so as to maintain high heat conductivity. Further, heat of the luminous body 40 may be conducted to the heat radiating member 14 through the anode 40a and cathode 40b.

(Heat Conductive Sheet)

The heat conductive sheet 15 is formed of an elastic sheet material made of insulating synthetic resin containing thermoplastic elastomer or non-silicon based thermoplastic resin, having high heat conductivity and excellent in elasticity. As illustrated in FIG. 13 and as denoted by a dashed line of FIG. 20B, the heat conductive sheet 15 is interposed between the circuit board 16 and heat radiating member 14 to be described later so as to efficiently conduct the heat of the luminous body 40 which has been radiated to the heat conductive layer 16b-2 of the circuit board 16 to the heat radiating member 14.

(Heat Radiating Member)

Figure 8:
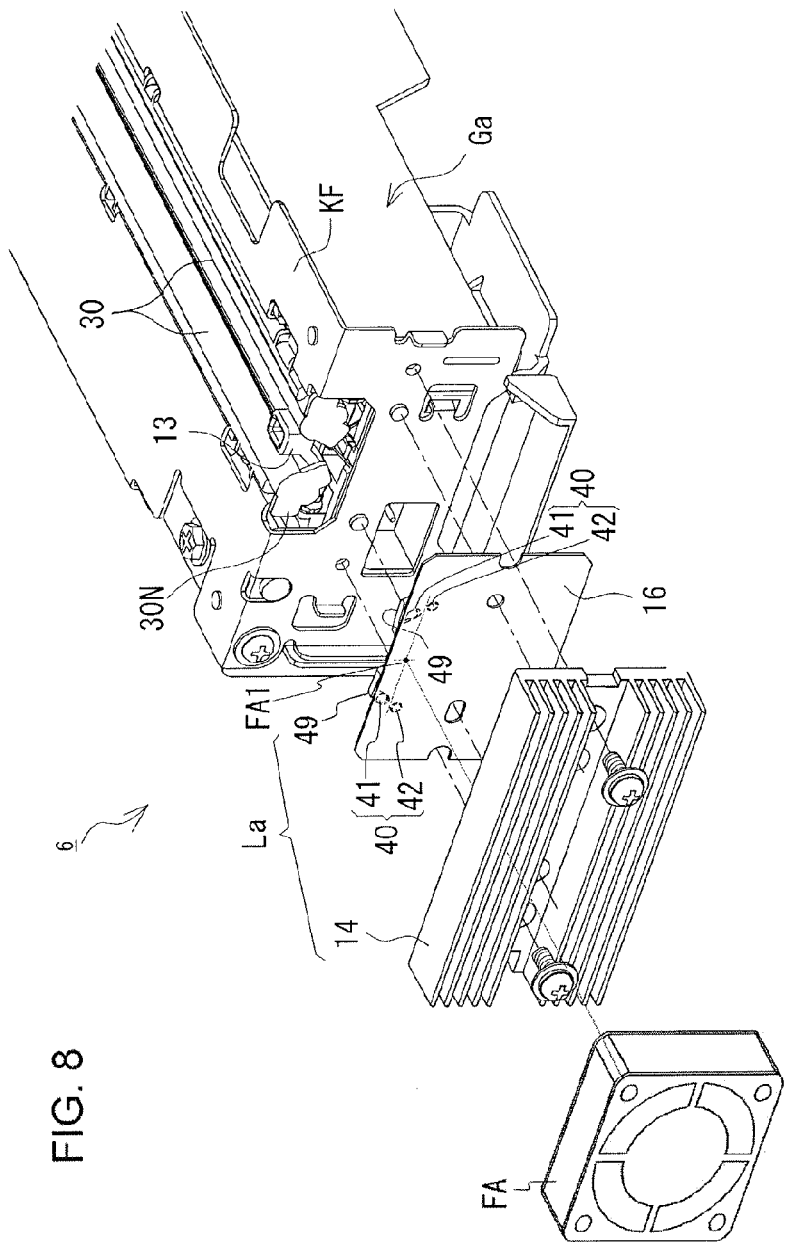
FIG. 8 is an exploded perspective view illustrating, in an enlarged manner, a main part of the illumination device of FIG. 7.

The heat radiating member 14 is commercially available as a heat sink and is formed of a metal material, such as an aluminum alloy, excellent in heat conductivity. The heat radiating member 14 has a plurality of projecting plate-like fins in order to increase a surface area thereof as illustrated in FIG. 8 and thus efficiently radiates heat of the luminous body 40 that has been conducted thereto through the above-described heat conductive sheet 15. Further, a cooling fan FA for blowing cooling air to the heat radiating member 14 for cooling purpose is disposed at a position of the reading carriage 6 in the document pass-through reading mode, which is denoted by a continuous line of FIG. 1.

(Cooling Fan)

Figure 9:
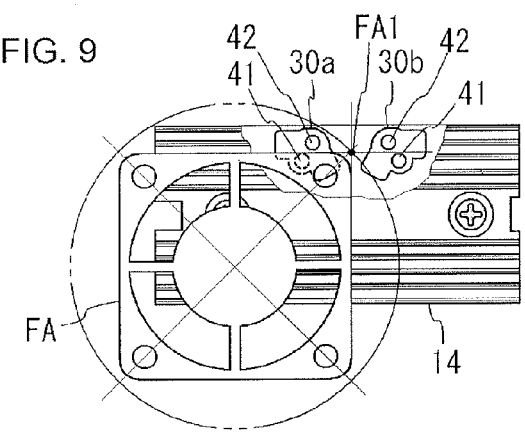
FIG. 9 is a front view of the illumination device of FIG. 8 as viewed from a cooling fan side.

The cooling fan FA will be described based on FIGS. 8 to 11. When the document pass-through reading mode is selected to cause the reading carriage 6 to be moved to the position denoted by the continuous line of FIG. 1, the cooling fan FA and heat radiating member face each other as illustrated in FIG. 8. To enhance cooling efficiency, the cooling fan FA and heat radiating member 14 have a positional relationship illustrated in FIG. 9. That is, as illustrated in FIG. 9, a point FA1 at which a wind speed is highest in wind speed characteristics of the cooling fan FA illustrated in FIG. 11 is positioned at substantially a center of the pair of luminous bodies 40. Actually, as illustrated in FIG. 11, a cooling fan FA having a size of 2 cm×2 cm is positioned such that the point FA1 and center of the pair of luminous bodies 40 coincide with each other. Further, as illustrated in FIG. 10, a part of the device housing 1 in which the cooling fan FA is mounted protrudes from the device frame. A filter FI is disposed at a leading end of the protrusion portion, and the cooling fan FA is supported at a portion spaced apart from the filter FI by a predetermined gap. This allow a suction port of the cooling fan FA to ensure a certain amount of space irrespective of the installation condition of the image reading device to prevent suction efficiency of the cooling fan FA from being lowered.
(Insulating Myler)

As illustrated in FIG. 13, the insulating Myler 47 is provided on a surface of the circuit board 16 on the light guide 30 side. The insulating Myler 47 insulates the wiring pattern on the circuit board 16 from the metal member constituting the rigid body KF to protect the surface of the circuit board 16 from being damaged.
(Reflector)

Further, as illustrated in FIGS. 13 to 19, there is provided the reflector 49 that restricts spectral characteristics of the first and second luminous bodies 41 and 42 of the luminous body 40 to within 90° so as to allow the light from the luminous body 40 to enter the light guide 30 without loss. The reflector 49 is provided per one luminous body. The reflector 49 is formed of a material having high reflectivity, which is obtained by depositing metal such as aluminum to a plastic material and has an umbrella shape spreading from the luminous body 40 toward the light guide 30. The umbrella-shaped part may be formed in a curve surface or in an inclined flat surface.
(Isolation between Luminous Bodies by Reflector)

Figure 17:
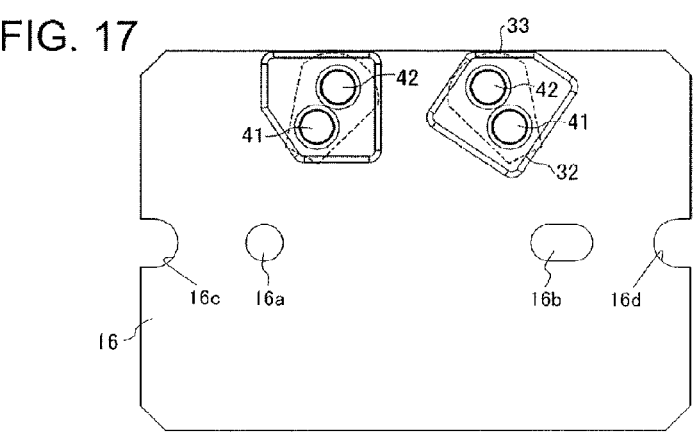
FIG. 17 is a plan view for explaining a light source unit in the illumination device of FIG. 13 as viewed from the light guide side.

Next, a supplementary description will be made of isolation between the luminous bodies by the reflector. As illustrated in FIGS. 17 and 18, the first and second luminous bodies 41 and 42 are configured such that light emission areas thereof are isolated from each other by the reflector 49. By isolating the lights that enter the light guide 30 from one end face 30L thereof from each other, it is possible to individually restrict the spectral characteristics of each of the first and second luminous bodies 41 and 42 and thus to allow the light emitted from each of the first and second luminous bodies 41 and 42 having the optimally-restricted spectral characteristics to enter the end face of the light guide only from a region restricted by the reflector, thereby further reducing occurrence of illumination spots.
<Assembly of Light Source Unit>

Assembly of the light source unit La will be described based on FIGS. 7 to 19. First, the luminous body 40 (41, 42) is mounted on the circuit board 16 as illustrated in FIGS. 17 to 19, and the lens cap 43 is attached to the luminous body 40 as illustrated in FIG. 19. The circuit board 16 is tightly attached to the heat radiating member 14 (heat sink) through the heat conductive sheet 15 (heat resistant elastic plate) as illustrated in FIG. 13 so as not to form an air space between the circuit board 16 and heat radiating member 14, and then the heat radiating member 14 and rigid body KF are tightly fixed to each other by screwing as illustrated in FIG. 14, whereby the circuit board 16, heat radiating member 14, and heat conductive sheet 15 are integrally fixed to the rigid body KF. Further, as illustrated in FIG. 7 and FIG. 17, the light incident surface 30L of the light guide 30 (30a, 30b) mounted to the rigid body KF supporting the heat radiating member 14 in a light guide unit assembly process and the luminous body 40 (41, 42) are mutually positioned with the reflector 49 interposed therebetween so as to face each other in a non-contact manner. Then, the rigid body KF is fixed by screws and the like to the unit frame 11 of the carriage 6, whereby mounting of the light source unit La on the carriage 6 is achieved. As a gap d between the light incident surface 30L of the light guide 30 (30a, 30b) and reflector 49 illustrated in FIG. 17, an air space of 0.5 mm to 1.0 mm is provided. This makes it difficult for the heat of the luminance body 40 (41, 42) to directly be transmitted or indirectly transmitted through the reflector 49 to the light guide 30 (30a, 30b), thereby preventing reduction in transmittance of the light guide 30 (30a, 30b) formed of transparent acrylic resin, epoxy resin, or the like caused in association with discoloration of the light incident surface 30L due to the heat of the luminous body 40 (41, 42).
<Configuration of Light Guide Unit>

Next, the light guide unit will be described based on FIGS. 7, 14, 15, 21, and 22. The light guide unit Ga has a symmetrical shape so as to face the pair of luminous bodies 40 and includes, as illustrated in FIG. 7, the light guide 30 (first light guide 30a, second light guide 30b), light guide housing member (light guide holder) 13, and light guide retaining member T (T1, T2) and is fixed to the rigid body KF supporting the light source unit La.

As illustrated in FIGS. 14 and 15, the light guide 30 is a rod-like translucent member formed into a rod-like shape extending in a longitudinal direction of the reading aperture 34 (see FIG. 4) by a length corresponding to the reading width (reading line width) W. The light guide 30 has a light incident surface 30L that receives light from the luminance body 40, side surfaces 30S that face each other and extend in a longitudinal direction so as to reflect the incident light from the one end face 30L (light incident surface) to the other end face 30R in the longitudinal direction, a reflecting surface 32 that reflects the reflected light from the mutually facing side surfaces 30S in a direction crossing the longitudinal direction, a light exit surface 33 that emits the reflected light from the reflecting surface 32 as illumination light, a projecting portion 30P that projects at least from one of the side surfaces 30S and extends in the longitudinal direction, and a projecting piece 30N that projects from the light incident surface 30L in a fan-like form. The light guide 30 is formed of a material excellent in translucency, such as transparent acrylic resin or epoxy resin. As illustrated in FIG. 14, the reflecting surface 32 and light exit surface 33 are formed so as to face each other spaced apart by a distance Ld and extend substantially in parallel to each other by a length corresponding to the reading line width W. The reflecting surface 32 and light exit surface 33 are connected to each other through the both side surfaces 30S. The luminous body 40 is disposed so as to face the light incident surface 30L. There is attached, to the other end face 30R, a reflecting plate 50 subjected to mirror surface treatment and having an outer surface with a reflecting layer formed of a material having high reflectivity, such as aluminum or silver, by an adhesive material (double-faced tape) 60 having a light transmittance of 90% or more so as to allow the outer surface to serve as a reflecting surface.
<Reflecting Surface>

Figure 15A:
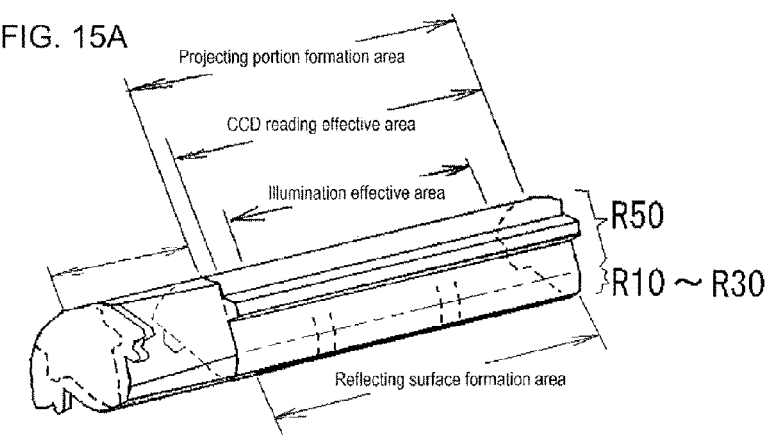
Figure 15B:
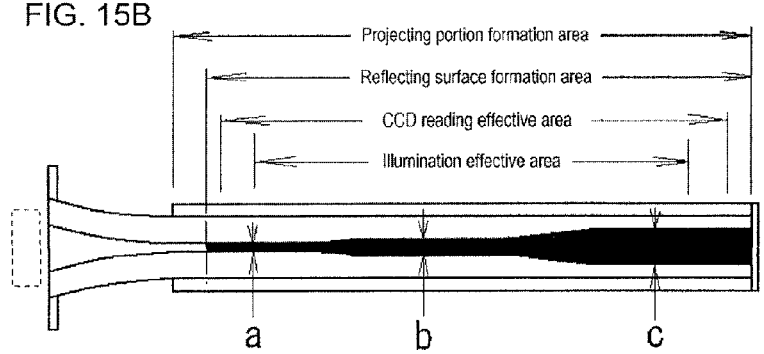

As illustrated in FIG. 15B, the reflecting surface 32 forms a pattern surface having a width sequentially increasing, as a→b→c, from the one end face (light incident surface) 30L side to the other end face 30R side. The reflecting surface 32 is formed into an uneven surface by performing coating, etching, or molding of reflective paint such as urethane-based white ink and is subjected to surface treatment so as to irregularly reflect introduced light. This surface treatment is not applied to a side near the light incident surface 30L of the light guide 30 as illustrated in FIGS. 14 and 15 but applied to a range from a portion spaced apart from the light incident surface 30L by a predetermined distance to the other end face 30R. In addition, as illustrated in FIG. 14, a base end portion of the surface treatment portion on the light incident surface 30L side is positioned between a base end portion of the reading line width W and a base end portion of the projecting portion 30P projecting from the side surface 30S on the light incident surface 30L side. That is, in order to make it easy for the light incident surface 30L of the light guide 30 to sufficiently take in the light of the light source unit La, a projecting width of the projecting portion 30P is utilized to gradually increase a gap between the mutually facing side surfaces 30S from the base end portion of the projecting portion 30P projecting from the side surface 30S on the light incident surface 30L side to obtain a trumpet shape (shape once narrowed from the end face toward the other end face and then expanded from the base end portion of the projection portion 30P on the incident surface 30L side), thereby achieving adequate intensity control. If the reading line width W and the surface treatment portion have substantially the same length, a peak of the light intensity of the reading line width W on the 30L side is shifted to the 30R side, with the result that the light intensity on the end portion on the 30L side becomes insufficient. In the present embodiment, in order to solve the problem of this insufficient light intensity, the surface treatment portion is previously set longer so as to make the light intensity distribution adequate. A shape of the pattern surface is, as described later in detail in the description of the side surface, is formed by changing a curvature of a curved surface R10 constituting the side surface, and the width of the pattern surface is set slightly larger than an actual pattern surface in consideration of a little bit of printing misalignment, etc.

<Light Exit Surface>

Figure 22:
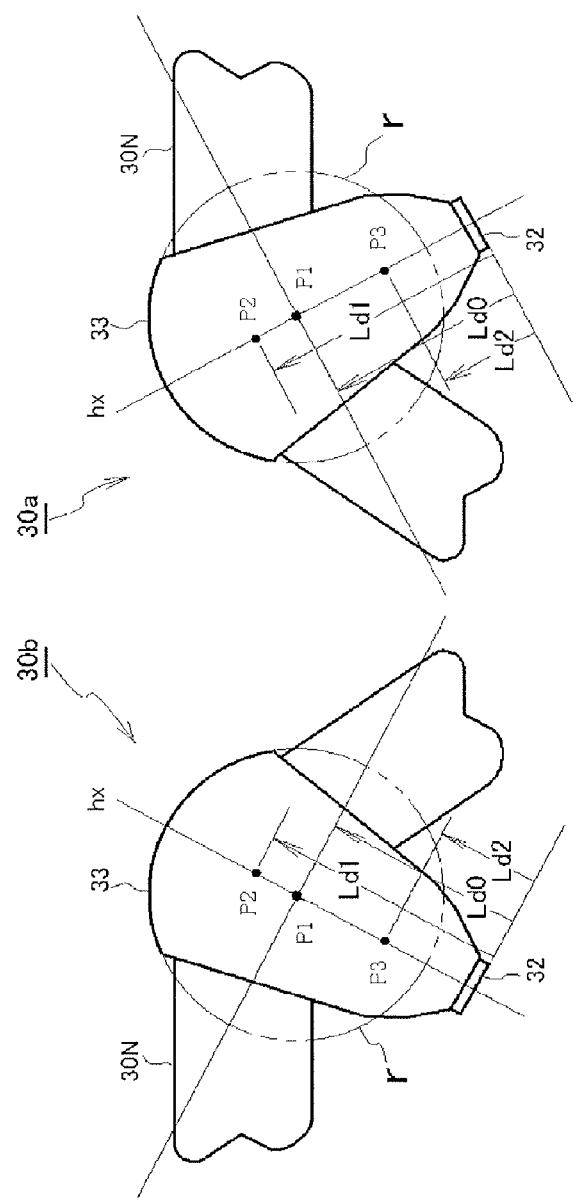
FIG. 22 is an enlarged plan view illustrating the position of the luminous body with respect to the light guide of FIG. 21B.

The light exit surface 33 of the light guide 30 is formed by a circumferential surface, as illustrated in FIG. 22. The circumferential surface has a radius of 3.7 mm±0.1 mm, and a center P1 thereof exists on a normal line hx which is a center line of an illumination optical system light path. As illustrated in FIG. 14, of the light reflected at a surface of the reflecting surface 32 to be diffused, light reaching the light exit surface 33 at an angle equal to or smaller than a critical angle is emitted from the light exit surface 33 toward an irradiation surface R (reading surface). To this end, the reflecting surface 32 is positioned outside the circumferential range of the light exit surface 33, and the position of the reflecting surface 32 is set to a position spaced apart from the light exit surface 33 by 8.46 mm±0.1 mm on the normal line hx.

<Side Surface>

Figure 15C:
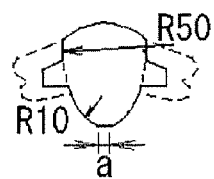
Figure 15D:
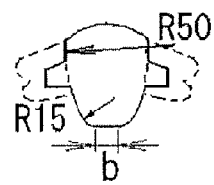
Figure 15E:
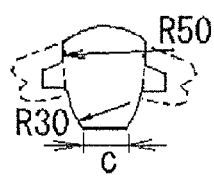

The side surfaces 30S of the light guide 30 on both side thereof are symmetric. Each of the side surfaces 30S has two or more varying curvatures and is formed by a curved surface obtained by connecting different curvatures without any edge. Specifically, as illustrated in FIGS. 15C to 15E, a curvature of a portion connected to the light exit surface 33 side is R50 (e.g., radius of 50 mm) which is constant in the longitudinal direction, a curvature of a portion connected to the reflecting surface 32 side is changed, in accordance with the widths (a, b, c) of the reflecting surface 32, sequentially from R10 (e.g., radius of 10 mm) to R15 (e.g., radius of 15 mm) and R30 (e.g., radius of 30 mm). This curvature change allows formation of the pattern surface having a width sequentially increasing, as a→b→c, from the one end face (light incident surface) 30L side to the other end face 30R side. By coating reflective paint such as urethane-based while ink to the pattern surface, the reflecting surface 32 can be easily formed.

<Shape of Side Surface>

A shape of the side surface 30S is designed so as to make it easy for the light incident surface 30L of the light guide 30 to sufficiently take in the light of the light source unit La. That is, as illustrated in FIGS. 15A and 15B, a projecting width of the projecting portion 30P is utilized to gradually increase a gap between the mutually facing side surfaces 30S from the base end portion of the projecting portion 30P projecting from the side surface 30S on the light incident surface 30L side to obtain a trumpet shape (shape once narrowed from the end face toward the other end face and then expanded from the base end portion of the projection portion 30P on the incident surface 30L side). The utilization of the projecting width of the projecting portion 30P for obtaining the trumpet shape (shape once narrowed from the end face toward the other end face and then expanded from the base end portion of the projection portion 30P on the incident surface 30L side) eliminates the need to increase an allowable width of the light guide, thereby maintaining compactness of the device. Further, by increasing a reflection angle of the light incident from the light incident surface 30L toward the other end face 30R by utilizing the trumpet shaped (shape once narrowed from the end face toward the other end face and then expanded from the base end portion of the projection portion 30P on the incident surface 30L side) curved surface, it is possible to increase reflection intensity of the light toward the other end face 30R, thereby facilitating the light intensity control at the other end face 30R side.

<Projecting Portion>

The projecting portion 30P projecting from the side surface 30S will be described based on FIGS. 14 and 15. The projecting portion 30P is formed as a flange-shaped projecting portion that projects from a center portion of the side surface 30S as illustrated. The projecting portion 30P is not formed at a portion near the one end face 30L. That is, the projecting portion 30P has its base end positioned between the base end portion of the reflecting surface 32 and light incident surface 30L and extends up to the other end face 30R. The reason that the projecting portion 30P is not extended up to the light incident surface 30L is that, if the projecting portion 30P is extended up to the light incident surface 30L, the light is irregularly reflected at the projecting portion 30P to adversely affect the spectral characteristics or the light goes outside from the light incident surface 30L to cause attenuation of the reflection intensity. The projecting portion 30P, which is continuously formed, is retained by the light guide retaining member T (T1, T2) when the light guide 30 (first light guide 30a, second light guide 30b) is housed in the light guide housing portion 13 (13a, 13b) to be described later for mounting to the rigid body KF, whereby eliminating warpage specific to the bar-like member caused in molding time of the light guide 30 or due to aging thereof.

<Reflecting Plate>

The reflecting plate 50 and adhesive material 60 provided on the other end face 30R of the light guide 30 are formed as a one sheet material. The adhesive material 60 is formed of an acrylic sheet material having a light transmission rate of 90% or more. The reflecting plate 50 serving as a sheet base material having the above-described reflecting surface is put on a front surface of the adhesive material 60, and a peel-off sheet having a not illustrated peel-off surface is put on a rear surface thereof, thereby forming one sheet material. Although a thickness of the sheet material constituted by the reflecting plate and adhesive material in the present embodiment is set to 25 μm, the thickness may be 25 μm or more as long as the light transmittance of 90% or more can be ensured. The sheet material conforming to an outer shape of the other end face 30R of the light guide is obtained by die-cutting, the peel-off sheet is peeled off from the adhesive material 60, and the reflecting plate 50 attached with the adhesive material 60 is attached to the other end face 30R of the light guide, whereby the reflecting plate attachment operation can be done with enhance workability. Only by attaching the reflecting plate 50 previously attached with the adhesive material 60 to the other end face 30R of the light guide, it is possible to reliably provide a certain gap between the reflecting plate 50 and the other end face 30R of the light guide by a thickness of the adhesive material 60. As in the case where a predetermined gap is provided between the one end face of the light guide and luminous body, this gap is provided in order to make the reflecting plate 50 closer to a light emission environment of the luminous body. That is, by creating a pseudo light source more similar to the luminous body, it is possible to obtain light intensity as high as that obtained in the case where luminous body is provided on both end faces of the light guide, as well as, horizontally uniform spectral characteristics of the linear light.

Further, as illustrated in FIG. 14, by inclining the reflecting surface of the other end face 30R by an angle θ with respect to the normal line hx of the reflecting surface 32 in a length direction, the light intensity characteristics can be corrected. That is, as illustrated in FIG. 14, when the angle of the reflecting surface is inclined by θ in a counterclockwise direction, the light intensity at the both end face portions in the main scan direction increases; while when the angle of the reflecting surface is inclined by θ in a clockwise direction, the light intensity at the both end face portions in the main scan direction decreases. Previously setting this angle in a design stage of the light guide 30 allows easy matching with the spectral characteristics of the condenser lens 7. An optimum value of the angle is about 10°.

Another configuration is possible in which the end portion of the light guide 30 on the pseudo luminous body side is not inclined, but the thickness of the adhesive sheet is changed to incline the other end portion 30R in a pseudo manner.

In the above description, the luminous body is provided at the one end face 30L of the light guide so as to face the one end face 30L with a predetermined gap, and the reflecting plate 50 is provided at the other end face 30R thereof. Alternatively, however, in place of the reflecting plate 50, there may be provided a luminous body having the similar configuration to the luminous body provided at the one end face of the light guide. In this case, the trumpet shape (shape once narrowed from the end face toward the other end face and then expanded from the base end portion of the projection portion 30P on the incident surface 30L side) of the light guide is made symmetrical with respect to a center portion of the light guide formed at the other end side, whereby an illumination device similar to that according to the present embodiment can be achieved.

<Path of Reflected Light from Incident Face to Exit Face>

The light of the luminous body 40 introduced in the light guide 30 is diffused in a predetermined direction at the reflecting surface 32. The light introduced in the light exit surface 33 at an angle equal to or larger than the critical angle is reflected inside, while the light introduced at an angle smaller than the critical angle is emitted outside. The light denoted by an arrow ha in FIG. 14 is reflected inside the light guide 30 to be diffused in a direction along the reading line width W, and the light denoted by an arrow hb is emitted from the light exit surface 33 to the reading surface R. Although not illustrated, the luminous body 40 to be described later emits light in a semispherical direction (180° direction; in the illustrated example, 60° wide-angle direction). This emitted light propagates inside the light guide 30 from the one end portion 30L to the other end portion 30R while repeating reflection. In the course of the propagation, the light reflected by the reflecting surface 32 toward the light exit surface 33 side is emitted outside the light guide 30.

The light that has reached the other end face 30R after repeatedly being reflected inside the light guide 30 is reflected by the reflecting plate 50 attached to the surface of the other end face 30R through the adhesive material 60 to be returned to the luminous body 40 side, and the light denoted by an arrow ha irregularly reflected at the reflecting surface 32 is emitted from the light exit surface 33 to the reading surface R. By utilizing the above characteristics, the following effect can be obtained. That is, by adjusting the position of the luminous body 40 with respect to the light incident surface 30L so as to reduce the light to be emitted from the light exit surface 33 on the light incident surface 30L side to the reading surface R and increase the light to be reflected at the surface of the other end face 30R, thereby allowing a decrease in the light intensity on the light incident surface 30L side and an increase in the light intensity on the other end face 30R side. This allows the intensity of the light to be emitted to the reading surface R to be uniform and allows, when the condenser lens 7 of an optical reduction system type is used, the light intensity characteristics to be brought close to the light intensity distribution according to the cosine fourth power law which depends on the lens characteristics.

<Light Guide Housing Member (Light Guide Holder)>

Figure 16:
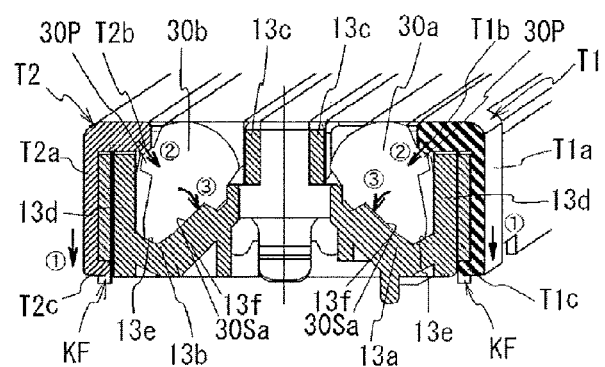
FIG. 16 is a cross-sectional enlarged view for explaining a light guide support mechanism of the illumination unit of FIG. 7.

The light guide housing member 13 that houses therein the light guide 30 will be described. As illustrated in FIGS. 7 and 16, the light guide housing member 13 (13a, 13b) constitutes, together with the light guide retaining member T (T1, T2), a light guide support means. The light guide housing member 13 has concaved groove portions 13a and 13b (first and second housing portions) extending in the longitudinal direction so as to house therein the light guide. The concaved groove portions 13a and 13b are formed integrally with the light guide housing member 13 at symmetrical positions. The groove portions 13a and 13b each have first and second side wall portions 13c, 13d facing the respective first and second side surfaces 30S of the light guide 30, a bottom portion 13e facing the reflecting surface 32 of the light guide 30, and a support surface 13f that supports the light guide 30 in the groove in a predetermined attitude. With the configuration in which the groove portions 13a and 13b are integrally formed with the light guide 30 at the symmetrical positions, simply by housing the left and right pair of light guides 30 (first light guide 30a, second light guide 30b) in the groove portions 13a and 13b, the light guides 30 can be retained at symmetrical positions, whereby the irradiation surface (R: see FIG. 2) can be illuminated in substantially a symmetrical manner with respect to a center thereof.

One of the first and second side surfaces 30S of the light guide 30 is set as a mounting reference surface 30Sa. The support surface 13f of the light guide housing member 13 has a support curved surface that surface-contacts the mounting reference surface 30Sa so as to support the light guide 30 inside each of the groove portions 13a and 13b in a predetermined attitude.

Since an inner surface of each of the groove portions 13a and 13h has a complicated shape, the light guide housing member 13 is resin molded and is likely to undergo warpage due to shrinkage at the molding time or aging. Thus, as illustrated in FIG. 7, the light guide housing member 13 is supported by the rigid body KF formed of metal so as to eliminate the warpage. That is, four locking claw portions 13a1 protrude from one side portion of the light guide housing member 13 and four locking claw portions 13b1 protrude from the other side portion of the light guide housing member 13, and voids are formed as claw locking portions KF1 and KF2 in the rigid body KF so as to allow insertion of the locking claw portions 13a1 and 13a2 from above and allow the locking claw portions 13a1 and 13a2 to be moved in a direction opposite to the light source unit La after insertion, thereby achieving a structure in which the locking claw portions 13a1 and 13a2 are locked to the claw locking portions KF1 and KF2, respectively.

<Light Guide Retaining Member>

As illustrated in FIGS. 7 and 16, the light guide retaining member T (T1, T2) is provided for retaining the light guide 30 (first light guide 30a, second light guide 30b) housed in each of the groove portions 13a and 13b in its housing position. The light guide retaining members T1 and T2 have, respectively, continuously-formed abutment surfaces T1b and T2b each extending in parallel to the projecting portion 30P of the light guide 30 housed in each of the groove portions 13a and 13b in the longitudinal direction and each abut against an upper inclined surface of the projecting portion 30P, locking portions T1a and T2a extending downward from six portions of the respective abutment surfaces T1b and T2b as illustrated in FIG. 7, and locking claws T1c and T2c formed respectively at leading ends of the locking portions T1a and T2a. As illustrated in FIG. 16, lower end portions of the rigid body KF that supports the side wall portions 13d of each of the light guide housing members 13 respectively by the locking claws T1c and T2c of the locking portions T1a and T2a, thereby bringing the abutment surfaces T1b and T2b into press contact with the inclined surfaces of the projecting portions 30P of each of the light guide housing members 13. This pressure contact brings the side surfaces 30Sa of each of the light guides 30 that face the support surfaces of the light guide housing members 13 into surface contact with the support surfaces 13f for positioning.

<Rigid Body>

The rigid body will be descried. The rigid body KF is formed of metal or a material having rigidity equivalent to metal that tightly sandwiches the circuit board 16 and heat conductive sheet 15 between itself and heat radiating member 14 so as to effectively conduct the heat of the circuit board 16 that receives the heat from the luminous body 40 of the light source unit La to the heat radiating member 14 through the heat conductive sheet 15. Further, the rigid body KF has a first plane KF3 having a first mounting reference for the sandwiching, as illustrated in FIG. 13, a second plane KF4 having a second mounting reference extending along the longitudinal direction of the light guide 30 from the first flat surface portion KF3 as illustrated in FIG. 7, and a third plane KF5.

<Mechanism for Eliminating Warpage of Light Guide and Light Guide Housing Member>

As described above, by forming the light guide housing member 13 (13a, 13b) and light guide retaining member T (T1, T2) constituting the light guide support means using different materials and by holding, together with the rigid body KF, the groove side wall portion 13d of the light guide housing member 13 by the locking claws T1c and T2c of the locking portions T1a and T2a of the light guide retaining member T (T1, T2) as illustrated in FIG. 16, the following effects can be obtained. The groove side wall portion 13d of the light guide housing member 13 is retained by the rigid body KF and set straight along the reference plane of the rigid body KF, thereby eliminating warpage of the light guide housing member 13 in a horizontal direction. At the same time, the abutment surfaces T1b and T2b of the light guide retaining member T (T1, T2) press the projecting portion 30P of the light guide 30 in a direction in which the side surface 30Sa of the light guide 30 and support surface 13f forming the support curved surface of the light guide housing member 13 surface-contact each other. The abutment surfaces T1b and T2b are formed so as to extend in the longitudinal direction together with the projection portion 30P of the light guide 30 and receive pressing force of the locking portions T1a and T2a even if the light guide 30 is warped into any shape to set straight the light guide 30 along the reference surface of the rigid body KF by abutment, thereby eliminating warpage of the light guide housing member 13 in a vertical direction.

<Face-to-Face Disposition Between Luminous Body and Light Guide>

Next, a supplementary description will be made of disposition of the luminous body that faces the light guide. That is, a description will be made of disposition between the light guide 30 having the end face 30L that takes in light, diffuse reflecting surface 32 that diffusely reflects the light taken in from the end face 30L, and light exit surface 33 that emits the light diffusely reflected at the diffuse reflecting surface 32 to the irradiation surface (R: see FIG. 2) and the luminous body 40 facing at least the one end face 30L of the light guide 30 as illustrated in FIGS. 21 to 23. As illustrated in FIG. 21B, the light exit surface 33 of the light guide 30 is formed by a circumferential surface (radius r), and the diffuse reflecting surface 32 is disposed at a position at which an optical axis normal line hx along which light passes through the center P1 of a circle constituting the circumferential surface (radius r) and emitted from the light exit surface 33 is formed. In the luminous body 40 mounted on the circuit substrate 16, the luminous body 42 is disposed at a first luminous body mounting position P2 which is set on the optical axis normal line hx of the diffuse reflecting surface 32 and shifted to the light exit surface 33 side with respect to the center P1 of the circle, and the luminous body 41 is disposed at a second luminous body mounting position 33 that is shifted to the diffuse reflecting surface 32 side with respect to the center 31 of the circle. Further, as illustrated in FIG. 22, with the diffuse reflecting surface 32 set as a reference, the center position of the circumferential surface (radius r) constituting the light exit surface 33 is set as Ld0, the first luminous body mounting position P2 at which the luminous body 42 is disposed is set as Ld1, and second luminous body mounting position P3 at which the luminous body 41 is disposed is set as Ld2.

When the luminous body 42 is provided between the center of the circle of the circumferential surface and light exit surface as illustrated in FIG. 23, the light intensity can be made higher at the both end portions of the light guide than at the center portion thereof. This allows the light intensity distribution most appropriate for the illumination device to be mounted in the image reading device of the optical reduction system described above to be achieved. Further, when the two luminous bodies 41 and 42 are used as the luminous body as illustrated in FIGS. 21 and 22, the light intensity can be increased by about two times, and the light intensity can be made higher at the both end portions of the light guide than at the center portion thereof. As a result, it is possible not only to achieve the light intensity distribution most appropriate for the illumination device to be mounted in the image reading device of the optical reduction system but also to increase illumination intensity to thereby increase an image reading speed, which is advantageous for the image reading device having so-called a sheet-through mode in which the document image is read while the document is automatically fed.

Further, with a configuration in which the position of the second luminous body 41 can be adjusted with respect to the first luminous body 42 as a positional reference, even if the intensity of the luminous body is degraded due to aging, it is possible to return the spectral characteristics to an initial proper state by fine adjustment of the position of the second luminous body 41.

<Positioning of Luminous Body Facing Light Guide>

Next, a supplementary description will be made of positioning of the luminous body that faces the light guide. As illustrated in FIGS. 12 and 14, both the light guide 30 and circuit board 16 are supported by the rigid body KF, and a positional relationship therebetween is properly maintained. The diffuse reflecting surface 32 of the light guide 30 is retained at a third position d3 positioned with respect to the second plane KF4 of the rigid body KF having the second mounting reference. The circuit board 16 is positioned at a first position d1 positioned with respect to the first plane KF3 having the first mounting reference based on the second plane KF4 with the luminous body 40 positioned at a, second position d2 facing a reference position d4 of the one end face of the light guide 30. That is, by positioning the diffuse reflecting surface 32 of the light guide 30 at the third position d3 based on the second plane KF4 of the rigid body KF having the second mounting reference, the mounting position d4 of the light guide is determined. At the same time, by mounting the circuit board 16 having the luminous body 40 mounted thereon to a predetermined position of the first plane KF3 having the first mounting reference based on the second plane KF4, the luminous body 40 mounted on the circuit board 16 is disposed at the second position d2 facing the one end face 30L of the light guide 30, thereby allowing the mounting reference position d2 of the luminous body and mounting reference position d4 of the light guide to easily coincide with each other. Further, it is possible to reduce a variation in the mounting position (position with respect to the optical axis normal line direction) of the luminous body facing the end face of the light guide, thereby reducing occurrence of the illumination spots as well as achieving adjustment of a predetermined gap between the light guide and luminous body.

There are formed, in the first plane KF3 of the rigid body KF having the first mounting reference for determining the mounting position of the light source unit La and the second mounting reference for determining the mounting position of the light guide unit, positioning portions 11a and 11b for positioning the circuit board 16 as illustrated in FIG. 13. The circuit board 16 has a positioning support portion (16a, 16b) to be supported by the positioning portions KFa and KFb. With this configuration, simply by mounting the positioning support portion (16a, 16b) of the circuit board 16 to the positioning portions 11a and 11b serving as a reference for mounting the light guide, the mounting position (position with respect to the optical axis normal line direction) of the luminous body facing the end face of the light guide can be fixed without displacement, thereby significantly facilitating assembly of the device.

<Maintenance of Gap between Light Guide and Luminous Body by Reflector>

A supplementary description will be made of maintenance of the gap between the light guide and luminous body. As illustrated in FIG. 14A, the illumination device 9 includes the light guide 30 having the end face 30L that takes in light, diffuse reflecting surface 32 that diffusely reflects the light taken in from the end face 30L, and light exit surface 33 that emits the light diffusely reflected at the diffuse reflecting surface 32 to the irradiation surface (R: see FIG. 2) and the luminous body 40 facing at least the one end face 30L of the light guide 30. The illumination device 9 further includes the reflector 49 having reflecting surfaces 49a and 49b that reflect the light from the luminous body 40 to the one end face 30L of the light guide 30. The light guide 30 has, its one end face 30L, a projecting piece 30N that abuts the reflector 49. The luminous body 40 is mounted to the circuit board 16 having the luminous body mounted thereon, and the reflector 49 is held between the projecting piece 30N of the light guide 30 and circuit board 16, with the result that a predetermined gap is maintained between the luminous body 40 and light guide 30. Thus, a gap between the luminous body and light guide can be defined by the reflector, preventing a variation of a dimension of the gap to reduce occurrence of the illumination spots. When this illumination device is used as a light: source unit of the image reading device, it is possible to prevent occurrence of the illumination spots in the read image.

The light guide 30 has, at its one end face 30L, the projecting piece 30N that abuts the reflector 49. The luminous body 40 is mounted/fixed to the circuit board 16, and the reflector 49 is held between the projecting piece 30N of the light guide 30 and circuit board 16, with the result that a predetermined gap is maintained between the luminous body 40 and light guide 30. With this configuration, the projecting portion of the light guide supports a plane of the reflector over a wide range, so that the circuit board having the luminous body mounted thereon and light guide can reliably be positioned through the reflector, and the positioning state therebetween can be maintained.

The circuit board 16 having the luminous body mounted thereon is disposed with a gap d provided between the light emission surface of the luminous body and light incident surface 30L. The gap d is preferably in a range from 0.1 mm to 0.55 mm. FIG. 14 illustrates an arrangement configuration in a state where the luminous body 40 (41, 42) is mounted on the circuit board 16. The luminous body 40 (41, 42) is constituted by a surface light emitting element and the white LED is used as the luminous body in the present embodiment. Further, in place of the reflective paint of the other end face 30R, the luminous body 40 (41, 42) may be provided also at the other end face 30R so as to increase the entire light intensity. In this case, the first and second luminous bodies 41 and 42 emit lights at different positions between the reflecting surface 32 and light exit surface 33 and the lights emitted therefrom enter the light guide 30 from the light incident surface 30L of the light guide 30. In addition, the first and second luminous bodies 41 and 42 are arranged spaced apart from each other in an exit light path (denoted by an arrow hx in FIG. 14) extending from the light exit surface 33 to the reading surface R.

In this embodiment that defines the gap between the luminous body and light guide using the reflector, one of left and right planes of the reflector directly abuts against the plane of the circuit board having the luminous body mounted thereon, and the other one directly abuts against the one end face of the light guide. Alternatively, however, the following configuration may be adopted.

The surface of the reflector is coated with a metal film, such as an aluminum film, or a silver film, having high reflection efficiency, so that a thin insulating Mylar may be disposed between the reflector and the circuit board having the luminous body mounted thereon. Further, alternatively, the thin insulating Mylar may be provided in the same manner as above for the purpose of reducing a variation of light of the luminous body.

Further, the surfaces of the reflector and surfaces abutting thereagainst are flat surfaces, but not limited to this. For example, when one of the abutting surfaces has a concavo-convex shape, the other one should be a reversed concavo-convex shape. Further, when one of the abutting surfaces has a curved shape, the other one should be a reversed curved shape.

Further, when the light emission surface of the luminous body to be mounted on the circuit board is widely flat, the luminous body itself may be made to abut against the reflector.

Further, the reflector itself may be integrally formed as a part of the luminous body or apart of the light guide, or the reflector may be used to define the gap between the luminous body and light guide.

Although the luminous body is provided at one end of the light guide, and the reflecting plate serving as a pseudo light surface is provided at the other end in the above embodiment, when an additional luminous body is provided at the other end of the light guide for the purpose of increasing the absolute light intensity, the reflector is also provided by necessity at the other end of the light guide.

[Another Embodiment of Illumination Device]

Figure 23A:
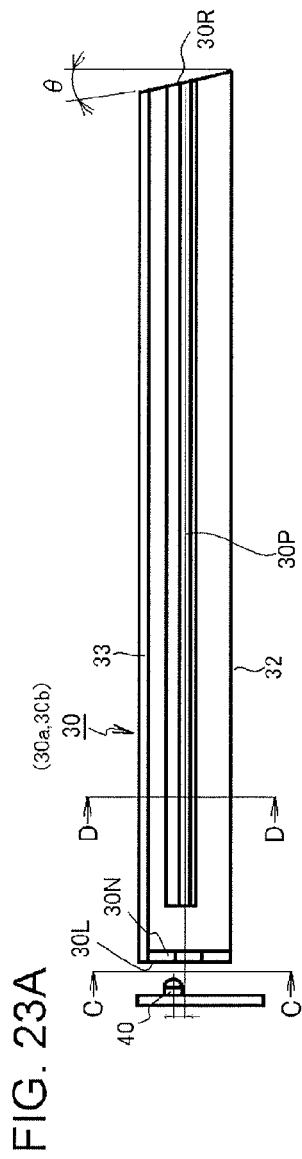
Figure 23C:
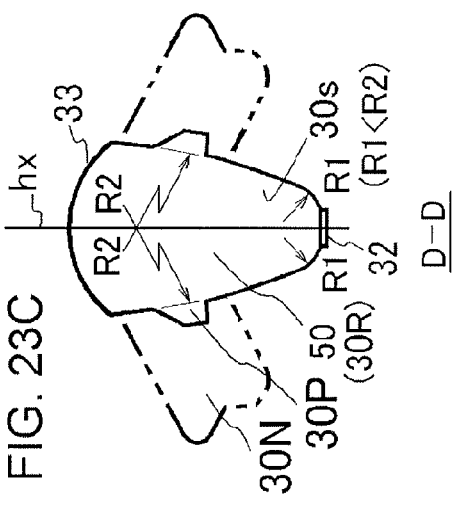
Figure 23B:
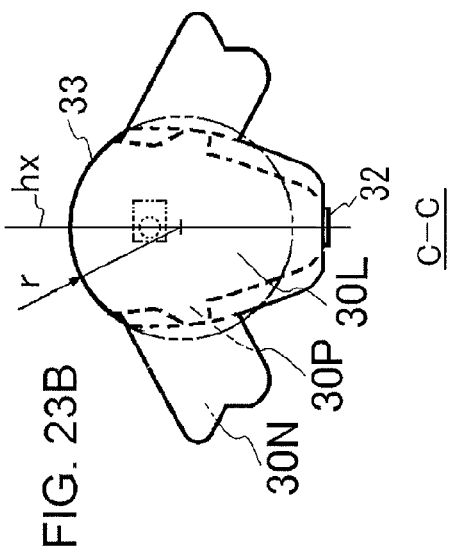

Next, another embodiment of the above-described illumination device will be described. FIGS. 23A to 23C are views corresponding to FIGS. 21A to 21C, respectively, which illustrate a positional relationship between the luminous body and light guide in the light source unit according to another embodiment, in which FIG. 23A is a side view, FIG. 23B is a plan view illustrating a position of the luminous body with respect to the light guide as viewed from the luminous body side one end of the light guide, and FIG. 23C is a plan view illustrating the position of the luminous body as viewed from the other end side of the light guide. The configuration of FIG. 23 only differs from that of FIG. 21 in the arrangement and brightness of the luminous body and light guide depending on whether the luminous body 40 is constituted by a single light-emitting element or two light-emitting elements; however, they are substantially the same in basic function.

In this embodiment, as illustrated in FIG. 23A, the luminous body 40 is constituted by a single light-emitting element that faces the light incident surface 30L of the light guide 30 with a certain gap. This luminous body 40 is provided at the light emission source position P2 of FIG. 22. The spectral characteristics in this case will be described later in FIG. 24. Like FIG. 21, as shown in FIG. 1, only one of the light source units which are provided in pair at front and rear positions in the sub-scan direction with respect to the center of the reading surface R is illustrated.

[Spectral Characteristics of Illumination Device]

Next, the spectral characteristics of the illumination device in the image reading device of the present invention will be described based on a spectral characteristic view of FIG. 24. Spectral characteristic curves P1 to P4 in FIG. 24 are characteristics obtained when the luminous body 40 is disposed at positions P1 to P3 illustrated in FIG. 22. The spectral characteristic curve P1 represents spectral characteristics obtained when the luminous body 40 constituted by a single light-emitting element (white LED) is disposed at a position of P1 of FIG. 22, the spectral characteristic curve P2 represents spectral characteristics of the another embodiment of FIG. 23 obtained when the luminous body 40 constituted by a single light-emitting element is disposed at a position of P2 illustrated in FIG. 22, and the spectral characteristic curve P3 represents spectral characteristics obtained when the luminous body 40 constituted by a single light-emitting element is disposed at a position of P3 illustrated in FIG. 22. Further, the spectral characteristic curve P4 represents spectral characteristics of the first embodiment illustrated in FIGS. 2 to 21 obtained when the luminous body 40 (41, 42) constituted by two light-emitting elements, (white LEDs) is disposed such that 41 and 42 are disposed at positions of P2 and P3 illustrated in FIG. 22, respectively. In the case of the illumination device of the image reading device having the above-mentioned contact type optical system, substantially uniform spectral characteristics are required. Thus, in this case, by disposing the luminous body 40 constituted by a single light-emitting element at the position of P1 illustrated in FIG. 22, an illumination device having ideal spectral characteristics can be obtained. On the other hand, in the case of the illumination device of the image reading device of the optical reduction system type that is influenced by the cosine fourth power law of the condenser lens, the light intensity needs to be made higher at the both end portions than at the center portion. Thus, in a case where reading is possible even if the entire light intensity is comparatively low, by disposing the luminous body 40 constituted by a single light-emitting element at the position of P2 illustrated in FIG. 22, an illumination device having ideal spectral characteristics can be obtained; in a case where reading is impossible unless the entire light intensity is comparatively high, by disposing the luminous body 40 (41, 42) constituted by two light-emitting elements such that the second and first light emission sources 42 and first luminous body 41 are disposed at the positions of P2 and P3 illustrated in FIG. 22, an illumination device having ideal spectral characteristics can be obtained.

[Configuration of Image Reading Control System]

Figure 25:
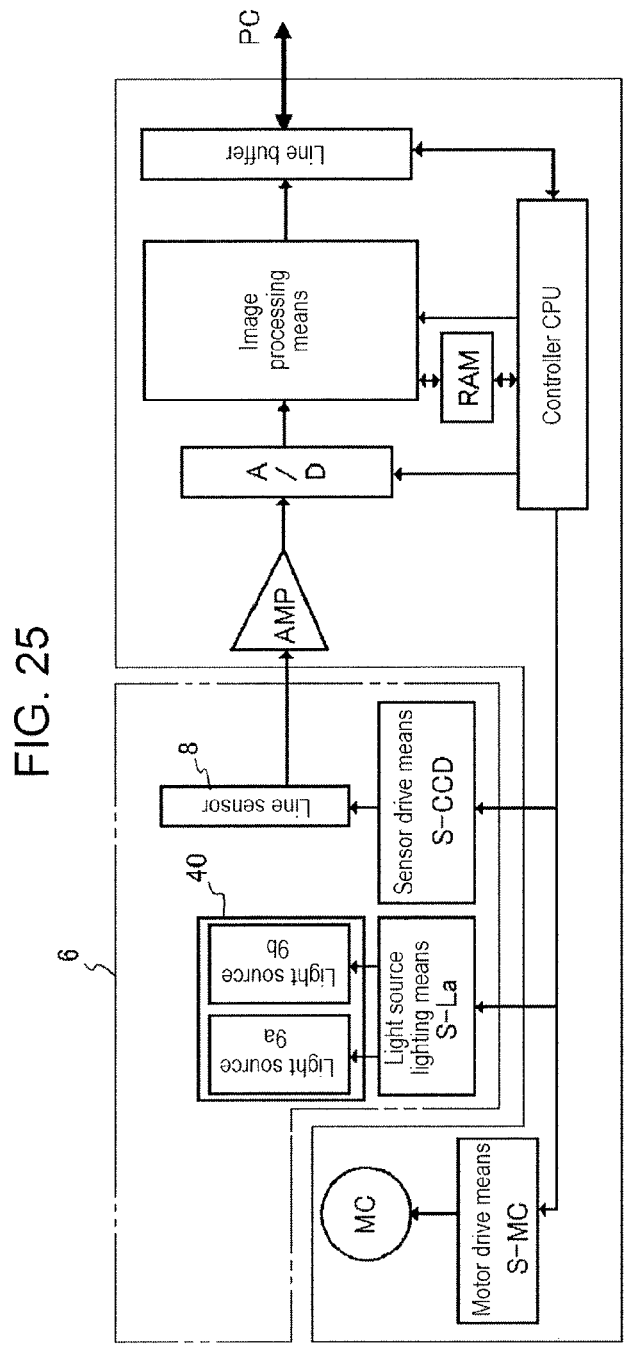
FIG. 25 is a functional block diagram illustrating a control system in the image reading device of FIG. 1 that reads a document image.

Next, an outline of a control system of the image reading device illustrated in FIG. 1 that reads the document image will be described based on FIG. 25. FIG. 25 is a functional block diagram illustrating the control system of the image reading device that reads the document image. A part surrounded by a long dashed double-short dashed line corresponds to the reading carriage 6, and a part surrounded by a thin continuous line corresponds to a control board S provided in the image scanning unit A. Basic operations of respective functional blocks in the image reading device are as follows. A controller CPU of the control board drives a motor drive means S-MC, a light source lighting means S-La, and a sensor drive means S-CCD. The sensor drive means S-CCD makes the line sensor 8 perform reading operation of the document sheet. That is, in a state where the reading carriage is being moved or stopped as needed by the motor drive means S-MC, the light source lighting means S-La arbitrarily turns on the luminous body 40 to illuminate the document sheet, causing reflected light from the document to be focused on the line sensor 8 for photoelectric conversion and charge accumulation. An output signal from the sensor 16 is amplified by an amplifier circuit AMP and is then converted into a digital image signal by an A/D converter. The resultant digital image signal is subjected to image processing such as shading correction using shading data stored in an RAM, digital gain adjustment, or digital black correction in an image processing means. Thereafter, the resultant digital image signal is stored in a line buffer and transferred to an external device such as a personal computer through an interface. All the above operations are executed by the controller CPU controlling the respective functional blocks based on an instruction from a driver means of the external device.

[Control Configuration of Light Source]

Control of the illumination unit 9 by the light source lighting means S-La will be described. As illustrated in FIG. 1, the first and second illumination units 9a and 9b irradiate the reading surface R of the first and second platens 2 and 3 with light and use diffusely reflected light from the reading document. Although the first and second illumination units 9a and 9b are each constituted by two luminous bodies 40 in the example illustrated in FIG. 21, the present invention is not limited to this. For example, the first and second illumination units 9a and 9b may each be constituted by a single luminous body 40 as illustrated in FIG. 23 or three or more luminous bodies 40 (not illustrated). When the number of the light sources is increased to increase the entire illumination intensity, it is possible to ensure sufficient reading intensity which is obtained as a product of the illumination intensity and reading time, even if a feeding speed of the document traveling on the second platen 3 is increased by the document feeding unit B in order to increase the reading speed to reduce the reading time in each reading line, thereby achieving high-speed reading using the document feeding unit B.

Actually, the carriage 6 is stopped at a position below the second platen 3, and the speed of reading the document fed on the second platen 3 is increased as compared to a case where the document is read while the carriage 6 is moved along the document placed on the first platen 1. Therefore, it is preferable that the light intensity for the reading operation using the second platen 3 is made higher than the light intensity for reading operation using the first platen 1.

Thus, there can be adopted not only a control method that simultaneously turns on the first and second illumination units 9a and 9b, but also a control method that turns on only the first illumination unit 9a when the carriage 6 is positioned below the first platen 2 and turns on both the first and second illumination units 9a and 9b when the carriage 6 is positioned below the second platen 3.

[Means for Preventing Reflection between Light Guide]

As described above, the above-described image reading device includes the luminous body, pair of light guides serving as linear light sources that receive light from the luminous body and irradiate the reading surface that faces the light guides across the reading line, and line sensor that receives the reflected light from the reading surface as image data. In this configuration, when the pair of light guides (30a, 30b) constituted by the first illumination unit 9a (first light guide 30a) and second illumination unit 9b (second light guide Mb) are disposed symmetrically with respect to an optical axis extending along a normal line ho of the reading surface R as illustrated in FIG. 2, reflection of the light is repeated between the pair of light guides, with the result that the intensity spots are likely to occur in the read image as described above and, in some cases, coloring may change between adjacent pixels. Thus, in order to reduce occurrence of such phenomenon, the image reading device of the present invention has a means ST (ST1, ST2, and ST3) for preventing reflection between light guides that prevents the reflected light of a reflected component that is emitted from one of the pair of light guides and at least positively reflected at the reading surface to the other one of the light guides from being reflected at the latter to the former once again through the reading surface or attenuates this phenomenon. Hereinafter, the reflection preventing means ST will be described based on FIGS. 3A to 3C.

FIRST EXAMPLE

First, a reflection preventing means illustrated in FIG. 3A will be described. A shield plate ST1 (reflection preventing means between light guides) is attached to the illumination device 9 by a double-faced tape or adhesive so as to be interposed between the reading surface R and pair of light guides 30 (30a, 30b) and to cover substantially the half part of each of the light guides. Actually, as denoted by solid line, an inner end portion of the shield plate ST1 that covers substantially the outer half of each of the light guides is located at a position that shields part of light emitted from the light guide to the reading surface that passes outside two equal side constituting substantially an isosceles triangle having a bottom side defined by a side connecting center portions of the pair of light guides 30 (30a, 30b) and an apex defined by a center portion of the reading line of the reading surface R. The shield plate ST1 is obtained by cutting a black film sheet obtained by having synthetic resin such as polyester or polycarbonate containing black pigment such as carbon and is formed into a thin frame body having, at its center portion, a rectangular aperture elongated in the longitudinal direction of the rod-like light guide, through which the light with which the reading surface R is irradiated penetrates. In this example, a polycarbonate film having a film thickness of, e.g., 0.18 mm is used as the shield plate ST. Thus obtained shield plate ST1 is attached to a light emission aperture surface of the illumination device 9 serving as a support body for supporting the pair of light guides by an adhesive means such as a double-faced tape at a portion in front of the light guides on the reading surface side in a positioned state as illustrated in the drawing. By the shield plate ST1, reflected lights *1 and *2 (only one side is illustrated in the drawing) denoted by dashed lines that are positively reflected at the reading surface R can be shielded. If allowable in terms of product specification, a configuration in which only one side of the light guides is shielded may be adopted. The above center portion of each of the pair of light guides 30 (30a, 30b) is a reflection surface center of a common light guide serving as a base end of the illumination light.

SECOND EXAMPLE

Next, a reflection preventing means illustrated in FIG. 3B will be described. A convex portion ST2 (reflection preventing means between light guides) is formed on the light exit surface 33 (see FIG. 14) of the pair of light guide 30 (30a, 30b). The convex portion ST2 has a diffusion surface that diffuses incident light emitted from the other light guide and reflected at the reading surface R. Actually, the illustrated convex portion ST2 projects from the light exit surface 33 in a semicircular shape having a radius of 0.75 mm to 1.0 mm and extends in the longitudinal direction of the rod-like light guide so as not to return back but to diffuse, at its projecting surface, incident reflected light *3 (only one side is illustrated in the drawing) emitted from the other light guide and reflected at the reading surface R. If allowable in terms of product specification, a configuration may be adopted in which the convex portion ST2 is formed in only one of the light guides. Further, a plurality of the convex portions ST2 may be formed adjacently in one light guide.

THIRD EXAMPLE

Next, a reflection preventing means illustrated in FIG. 3C will be described. As illustrated, the pair of light guides 30 (30a, 30b) are disposed asymmetrically (ST3: reflection preventing means between light guides) with respect to the optical axis ho of reflected light reflected at the reading surface and directed in the normal direction. By disposing the pair of light guides 30 asymmetrically (ST3), the light emitted from one light guide and reaches the other light guide through the reading surface R and the light emitted from the other light guide and reaches the one light guide through the reading surface R do not coincide with each other. For example, reflected light *4 that reaches the one light guide and enters therein from the light exit surface 33 is emitted in a different direction from the light exit surface 33, with the result that reflected light repeatedly reflected between the pair of light guides can be attenuated. By the way, a distance between the optical axis ho and light guide 30a and a distance between the optical axis ho and light guide 30b are made to differ from each other, a distance between the reading surface R and light guide 30a and a distance between the reading surface R and light guide 30b may be made to differ from each other, as described. Further, in a case where the light guides 30a and 30b have the illustrated shape, positions of the light guides 30a and 30b are not changed, but attitude of the light guide 30b is made to differ from the attitude of the light guide 30a.

Also in this case, an asymmetric state can be achieved in terms of a light path of an optical system.

FOURTH EXAMPLE

Further, by arbitrarily combining the reflection preventing means ST between light guides of the above-described first to third examples, it is possible to attenuate reflected light repeatedly reflected between the pair of light guides more effectively.

As illustrated, in the image reading device, heat of the line sensor 8 as a heat generation source is transmitted from a sensor support member to the unit frame 11 through a lens support member. The sixth mirror 10f is supported by a mold member 57 of the unit frame 11, so that a mirror may be unintentionally inclined or displaced under the influence of heat, which may in turn cause a variation in the position of the optical system. The sixth mirror 10f is a final mirror that receives light in the last place to make the light enter the line sensor 8, so that accuracy is required for the sixth mirror 10f in terms of angle and position. However, the sixth mirror 10f is provided at a position near the line sensor 8, to which heat of the line sensor 8 is easily conducted, so that it is subjected to heat expansion of the unit frame. Thus, a cut portion 58 is formed so as to isolate amounting portion of the sixth mirror 10f from other components, thereby achieving heat radiating function. By increasing a surface area of the cut portion 58 or by forming a plurality of cut portions 58, heat radiating performance can be enhanced.

INDUSTRIAL APPLICABILITY

The illumination device according to the present invention can be applied to a device other then the above-described image reading apparatus and can be used as an illumination device for an optical instrument such as an optical microscope, an overhead projector, or a projector, or as a household use illumination device.

The application claims the benefits of Japanese Patent Application No. 2011-136808, Japanese Patent Application No. 2011-136809, and Japanese Patent Application No. 2011-136810, which are hereby incorporated by reference.

EXPLANATION OF REFERENCE SYMBOLS

A: Image scanning unit
B: Document feeding unit
T: Light guide retaining member (light guide support means)
T1b: Abutment surface
T2b: Abutment surface
T1c: Locking claw
T2c: Locking claw
KF: Rigid body
9: Illumination device
9a: First illumination unit
9b: Second illumination unit
13: Light guide housing member (light guide support means)
13a: Groove portion
13c: First side wall portion
13d: Second side wall portion
13e: Bottom portion
13f: Support surface
30: Light guide
30a: First light guide
30b: Second light guide
30L: Light incident surface
30S: First and second side surfaces
32: Reflecting surface
33: Light exit surface
30P: Projecting portion
40: Luminous body

The invention claimed is:

1. An image scanning unit comprising:
a light source unit,
the light source unit including: a light guide which is formed into a rod-like shape extending in a main scan direction and has, at at least one end thereof, an end face for taking in light, a diffuse reflecting surface for diffusely reflecting the light taken in from the end face, and a light exit surface for emitting the light that is diffusely reflected at the diffuse reflecting surface towards an irradiation surface; a light source facing the end face of the light guide; and a light guide holder member holding the light guide;
an image reading section receiving reflected light from the irradiation surface;
a plurality of reflecting members forming a reading light path guiding the reflected light from the irradiation surface to the image reading section; and
a frame housing the light source unit and the plurality of reflecting members, wherein
the frame divides a space facing the irradiation surface into at least two including first and second spaces to form a first housing section for housing the light source unit in the first space and a second housing section for housing at least one of the plurality of reflecting members in the second space adjacent to the first space,
a first reflecting member of the plurality of reflecting members first receiving the reflected light from the irradiation surface is disposed at a side opposite to the irradiation surface with respect to the first housing section, and
a light-shielding member is provided between the first reflecting member and a reflecting member of the at least one of the plurality of reflecting members other than the first reflecting member positioned in the second space so as to prevent the light from the first reflecting member that has strayed from the reading light path from entering the reflecting member in the second space.

2. The image scanning unit according to claim 1, wherein the light-shielding member is constituted by the light guide holder member or a holder retaining member that retains the light guide holder.

3. The image scanning unit according to claim 2, wherein in the light source unit, the holder retaining member includes the first reference surface, second reference surface extending in a direction substantially perpendicular to the first reference surface and serving as a mounting surface of the light source, and a third reference surface that regulates a position of an end portion of the light guide with respect to the light source, and
the second reference surface defines the predetermined interval.

4. The image scanning unit according to claim 3, wherein the holder retaining member has an opening that houses the light guide holder, and
the first reference surface is formed in at least one wall of the opening extending in the longitudinal direction.

5. The image scanning unit according to claim 4, wherein the light guide holder member includes a receiving portion in which the light guide is housed, and an outer wall of the receiving portion extending in the longitudinal direction abuts against the wall of the holder retaining member.

6. The image scanning unit according to claim 3, wherein the light guide has a flange portion at at least one end thereof in the longitudinal direction, and when the light guide holder is fixed to the holder retaining member, the flange of the light guide housed in the light guide holder member is made to abut against the third reference surface of the holder retaining member to fix a position of the light guide with respect to the light source.

7. The image scanning unit according to claim 1, wherein the light-shielding member is constituted by a side surface of the light guide holder member on the second space side and a bottom surface of the light guide holder member.

8. The image scanning unit according to claim 1, wherein the light guide holder member is retained by a holder retaining member formed of a rigid material such as metal, and the holder retaining member has a first reference surface and a second reference surface, the first reference surface extending in the main scan direction and being fitted to the light guide holder member so as to contact at least one side surface of the light guide holder member in a longitudinal direction thereof to correct attitude of the light guide holder member, the second reference surface being used as a reference based on which the light source is disposed opposite to the end face of the light guide and spaced apart therefrom by a predetermined interval.

9. The image scanning unit according to claim 1, wherein a housing portion that houses a corner portion of the first reflecting member that is positioned nearest the irradiation surface extending in the scanning direction is formed in a surface of the light guide holder member on a side of the first reflecting member to allow the corner portion housed in the housing portion to serve as a light shield that prevents the reflected light from the irradiation surface from entering the corner portion.

10. The image scanning unit according to claim 1, wherein the at least one of the plurality of reflecting members is disposed so as to face a reflection reference surface of the first reflecting member with a surface thereof opposite to the reflection reference surface directed to the first reflecting member and disposed at a position on a side of the light source unit with respect to the reading light path of the light reflected from the first reflecting member.

11. The image scanning unit according to claim 1, wherein the plurality of reflecting members includes, in the second space, a second reflecting member that faces the light-shielding member with a surface thereof opposite to the reflection reference surface directed thereto and a third reflecting member provided at a position more away from the first reflecting member than the second reflecting member from the first reflecting member, and the third reflecting member is disposed at a position more away from a reading light path going from the first reflecting member to its subsequent reflecting member than the second reflecting member from the reading light path.

12. The image scanning unit according to claim 11, wherein in the second space, an angle formed between the third reflecting member and the reading light path going from the first reflecting member to its subsequent reflecting member is smaller than an angle formed between the second reflecting member and the reading light path going from the first reflecting member to its subsequent reflecting member.

* * * * *